(12) United States Patent
Werbitt

(10) Patent No.: US 10,157,414 B2
(45) Date of Patent: Dec. 18, 2018

(54) PATRON SERVICE SYSTEM AND METHOD

(71) Applicant: Julie M. Werbitt, Broomfield, CO (US)

(72) Inventor: Julie M. Werbitt, Broomfield, CO (US)

(*) Notice: Subject to any disclaimer, the term of this patent is extended or adjusted under 35 U.S.C. 154(b) by 31 days.

(21) Appl. No.: 15/820,195

(22) Filed: Nov. 21, 2017

(65) Prior Publication Data
US 2018/0075518 A1 Mar. 15, 2018

Related U.S. Application Data

(63) Continuation of application No. 14/317,347, filed on Jun. 27, 2014, which is a continuation of application
(Continued)

(51) Int. Cl.
G06Q 30/06 (2012.01)
G06Q 20/20 (2012.01)
G06Q 30/02 (2012.01)
G06Q 50/12 (2012.01)
H04L 29/06 (2006.01)
(Continued)

(52) U.S. Cl.
CPC ......... *G06Q 30/0633* (2013.01); *G06Q 20/20* (2013.01); *G06Q 30/02* (2013.01); *G06Q 30/0281* (2013.01); *G06Q 30/06* (2013.01); *G06Q 50/12* (2013.01); *H04L 29/06* (2013.01); *H04L 67/12* (2013.01); *H04W 4/00* (2013.01); *H04W 88/02* (2013.01); *H04L 69/329* (2013.01); *H04W 4/02* (2013.01)

(58) Field of Classification Search
CPC ........ G06Q 30/00; G06Q 20/00; G06Q 20/12; G06Q 20/20; G06Q 30/02; G06Q 10/02; G06F 1/16; G06F 3/033; G06F 17/30
USPC ................................. 705/15, 30, 5; 235/380
See application file for complete search history.

(56) References Cited

U.S. PATENT DOCUMENTS 4,569,421 A 2/1986 Sandstedt
5,003,472 A 3/1991 Perrill
(Continued)

FOREIGN PATENT DOCUMENTS

AU 2003275142 A1 5/2004
EP 1550324 A1 7/2005
(Continued)

*Primary Examiner* — Olusegun Goyea
(74) *Attorney, Agent, or Firm* — Fish & Richardson P.C.

(57) ABSTRACT

A method provides for using a wireless patron unit within a venue and within a vicinity of the venue. The method includes providing at least one patron with a wireless patron unit by either permitting the at least one patron to temporarily use a provided wireless patron unit that includes at least one venue specific application program, or by providing at least one venue specific application program to the at least one patron for downloading into a patron-owned wireless communication device that can be used during the at least one patron's visit to the venue. The method also includes connecting the wireless patron unit to a server enabling communication between the wireless patron unit and the server, entering a patron order for at least one item or service provided by the venue into the wireless patron unit, and determining a current location of the wireless patron unit.

19 Claims, 13 Drawing Sheets

Related U.S. Application Data

No. 13/073,368, filed on Mar. 28, 2011, now Pat. No. 9,202,244, which is a continuation of application No. 10/665,525, filed on Sep. 19, 2003, now Pat. No. 7,945,477.

(60) Provisional application No. 60/412,863, filed on Sep. 23, 2002.

(51) Int. Cl.
  *H04W 4/00* (2018.01)
  *H04W 88/02* (2009.01)
  *H04L 29/08* (2006.01)
  *H04W 4/02* (2018.01)

(56) References Cited

U.S. PATENT DOCUMENTS

| | | | |
|---|---|---|---|
| 5,485,163 A | 1/1996 | Singer | |
| 5,594,425 A | 1/1997 | Ladner | |
| 5,602,730 A | 2/1997 | Coleman | |
| 5,652,570 A | 7/1997 | Lepkofker | |
| 5,699,039 A | 12/1997 | Korzen | |
| 5,712,619 A | 1/1998 | Simkin | |
| 5,742,233 A | 4/1998 | Hoffman | |
| 5,794,207 A | 8/1998 | Walker | |
| 5,838,798 A * | 11/1998 | Stevens | G06Q 20/202 705/21 |
| 5,839,115 A | 11/1998 | Coleman | |
| 5,845,263 A | 12/1998 | Camaisa | |
| 5,910,799 A * | 6/1999 | Carpenter | G06F 3/033 715/866 |
| 6,298,331 B1 | 10/2001 | Walker | |
| 6,317,718 B1 | 11/2001 | Fano | |
| 6,366,196 B1 | 4/2002 | Green | |
| 6,473,739 B1 | 10/2002 | Showghi | |
| 6,532,415 B2 | 3/2003 | Nishikawa | |
| 6,681,109 B1 | 1/2004 | Leifer | |
| 6,782,974 B2 | 8/2004 | Leifer | |
| 6,845,361 B1 * | 1/2005 | Dowling | G06Q 10/02 705/13 |
| 6,865,261 B1 | 3/2005 | Rao | |
| 6,873,970 B2 * | 3/2005 | Showghi | G06Q 10/06312 705/15 |
| 6,920,431 B2 | 7/2005 | Showghi | |
| 7,035,618 B2 * | 4/2006 | Schnurr | H04L 51/043 455/403 |
| 7,257,547 B1 * | 8/2007 | Terase | G06Q 10/087 705/15 |
| 7,266,395 B2 | 9/2007 | Schnurr | |
| 7,353,033 B2 * | 4/2008 | Kwon | H04W 4/02 379/88.14 |
| 2002/0026364 A1 * | 2/2002 | Mayer | G06Q 10/10 705/15 |
| 2002/0137525 A1 * | 9/2002 | Fleischer | H04L 29/1216 455/456.3 |
| 2002/0138350 A1 | 9/2002 | Cogen | |
| 2002/0147647 A1 | 10/2002 | Ragsdale | |
| 2003/0050854 A1 * | 3/2003 | Showghi | G06Q 10/02 705/15 |
| 2003/0078793 A1 | 4/2003 | Toth | |
| 2003/0083889 A1 * | 5/2003 | MacKlin | G06Q 10/02 705/5 |
| 2003/0088469 A1 * | 5/2003 | Leifer | G06F 1/1626 705/15 |
| 2003/0089832 A1 | 5/2003 | Gold | |
| 2003/0126016 A1 * | 7/2003 | Asano | G06Q 20/00 705/15 |
| 2003/0212569 A1 | 11/2003 | Casati | |
| 2004/0034564 A1 * | 2/2004 | Liu | G06Q 30/02 705/15 |
| 2004/0054585 A1 * | 3/2004 | Baratz | G06O 30/0207 705/14.1 |
| 2004/0054592 A1 * | 3/2004 | Hernblad | G06Q 20/32 705/15 |
| 2004/0143503 A1 * | 7/2004 | Suthar | G06Q 30/06 705/15 |
| 2004/0256581 A1 | 12/2004 | Au | |
| 2006/0186197 A1 * | 8/2006 | Rosenberg | G06Q 30/00 235/380 |
| 2012/0136731 A1 | 5/2012 | Kidron | |

FOREIGN PATENT DOCUMENTS

| | | |
|---|---|---|
| IN | 223275 A1 | 11/2008 |
| MX | 273971 A1 | 2/2010 |
| WO | WO2004028177 A1 | 4/2004 |

\* cited by examiner

PATRON SERVICE SYSTEM AND METHOD

CROSS-REFERENCE TO RELATED APPLICATIONS

This application is a continuation of and claims priority to U.S. application Ser. No. 14/317,347, filed on Jun. 27, 2014, which is a continuation of U.S. application Ser. No. 13/073,368, filed Mar. 28, 2011, now U.S. Pat. No. 9,202,244, which is a continuation of Ser. No. 10/665,525, filed on Sep. 19, 2003, now U.S. Pat. No. 7,945,477, which issued on May 17, 2011, which claims the benefit of U.S. Provisional Application No. 60/412,863, filed on Sep. 23, 2002, the disclosures of which are expressly incorporated herein by reference in their entireties.

TECHNICAL FIELD

This invention relates to systems and methods for providing services to patrons at resorts, stadiums, arenas, and other venues.

BACKGROUND

The world's leading luxury and upscale hotels, resorts, cruise lines, vacation destinations, and other public venues often differentiate themselves in a competitive market by promising and attempting to deliver exceptional service and convenience to their patrons, such as guests, customers, spectators, visitors, clientele, and other clients (hereinafter referred to collectively as "patrons"). Successfully delivering on the promise of outstanding service not only attracts repeat business, but can also generate greater revenue and increased profitability. At the same time, patrons that these properties attract have elevated expectations of service, including increased levels of attention, convenience, speed and control. The service delivery challenge for the resort is to attend quickly to patrons when the require service, to fulfill patrons' requests in a timely and efficient manner, and finally to locate a patron for delivery of their order.

Despite their high expectations, patrons at luxury and upscale resorts currently face several inconveniences in ordering food, beverages, and other amenities and services while on the beach, at the pool and in other areas of the property. In many instances when patrons desire to place an order, they cannot find a staff member such as a server, a runner, a waiter, a waitress, beach attendant, recreational staff, an employee and other personnel (hereinafter referred to collectively as a "staff member") of an establishment in the vicinity. Often the patron is unable to attract the attention of the staff member, or the staff member may be busy attending to another patron. Additional problems arise once the order is taken, as the staff member may proceed to take additional orders before submitting initial patron's orders for fulfillment. The result is a delay in entering the initial orders to the resort's computer system (assuming there is a basic computer system) and thus delaying preparation of the order as well.

If a patron becomes tired of waiting for a staff member to take the order, the alternative is to walk, sometimes for great distances, to place an order for food, beverages, or services. Not only are patrons inconvenienced, but they also face the risks inherent in leaving children or personal belongings unsupervised and unprotected on the beach, pool deck, or other resort location.

Once the order is prepared and ready for delivery to the patron, it can be a challenge for the staff member to remember where the patron is located or to find where the patron has relocated. Oftentimes the person who took the order is often not the same person who delivers the order, or the patron has moved and is not seated where the original order was taken. The result is that patrons experience further delay in having their orders delivered.

Once a the item (such as a towel, beverage, food) has been delivered to the patron, and the staff member departs, any problem with the order (i.e., missing utensils or condiments, erroneous or ill-prepared items, etc.) requires the patron to chase after the staff member, walk to a service area, or wait for the staff member to return.

Additionally, since a staff member has no way to know if a patron is interested in ordering food or beverages, staff members may periodically "check-in" with the patron as they circulate on the beach, pool, or other locations, which sometimes results in annoying disturbances for the patron, if the patron has no interest in placing an order.

Furthermore, most resorts do not offer patrons the ability to purchase sundry items, reserve a tee time, tennis court, jet ski, or spa related appointments while seated at the beach or pool.

In an attempt to address some of the aforementioned problems, a limited number of hotels are deploying centrally-located kiosks. Unfortunately, these systems require patrons to leave their seats and walk some distance to place an order at a kiosk location. Again, not only are the patrons inconvenienced, but they also face the risks inherent in leaving children or personal belongings unsupervised and unprotected on the beach, pool deck, or other resort location when having to order from the kiosk location.

Additionally, kiosks do not enable the staff member to locate the patron for delivery of the order, thus requiring additional effort and further inconvenience to the patron if the patron must retrieve the order himself. Furthermore, in many instances there may be a line of patrons waiting to use a particular kiosk creating a further inconvenient experience for patrons when they attempt to place an order for themselves.

Some manufactures have introduced POS (point-of-sale) systems for use by staff at restaurants, which may include wireless handheld terminals, as an extension of the POS systems. These handheld terminals enable staff to input and manage patron orders at a distance. Unfortunately, these devices typically only allow the staff member, to take and transmit the order on behalf of the patron. The patron must still wait for a staff member to arrive so that the patron may initiate an order. Additionally, these systems do not lend themselves in many areas of a resort. For example, there remains the problem of locating the patron in a pool or beach environment after the order is taken. This problem is further exacerbated when the staff member who took the order is not the same person who delivers the order. Thus, centrally-located kiosks for patron use and handheld POS devices for a staff member's use, both are of limited effectiveness and, thus do not fully address the problems of both the patron and the resort.

The impact on the resort caused by these service failures is significant, and includes decreased patron satisfaction, higher costs through service inefficiencies, and missed opportunities to increase property revenues per patron, decreased repeat patron business, and decreased reputation/rating, etc.

SUMMARY

A patron service system and method is described herein with reference to several exemplary implementations.

For example, in one described implementation, portable patron units are provided to patrons for use in a resort or other establishment. The portable patron units are mobile wireless devices that include interactive display screens. The portable patron units enable patrons to interact, order items, request services, browse information associated with the resort and/or other information, wirelessly. Portable staff units are provided to staff members for use in the resort or other establishment. The portable staff units are also mobile wireless devices that include interactive display screens. The portable staff units, enable staff members to view information about orders and/or requests entered by patrons made by the patrons wirelessly. The portable staff units can also display locations of the portable patron units to enable staff members to locate portable patron units when delivering items, servicing requests, etc.

This implementation as well as others is described below when read in conjunction with the accompanying drawings.

BRIEF DESCRIPTION OF THE DRAWINGS

The detailed description is described with reference to the accompanying figures. In the figures, the left-most digit(s) of a reference number identifies the figure in which the reference number first appears. It should be noted that the figures are not drawn to scale and are for illustration purposes only.

DETAILED DESCRIPTION

Patron Service System

Figure 1:
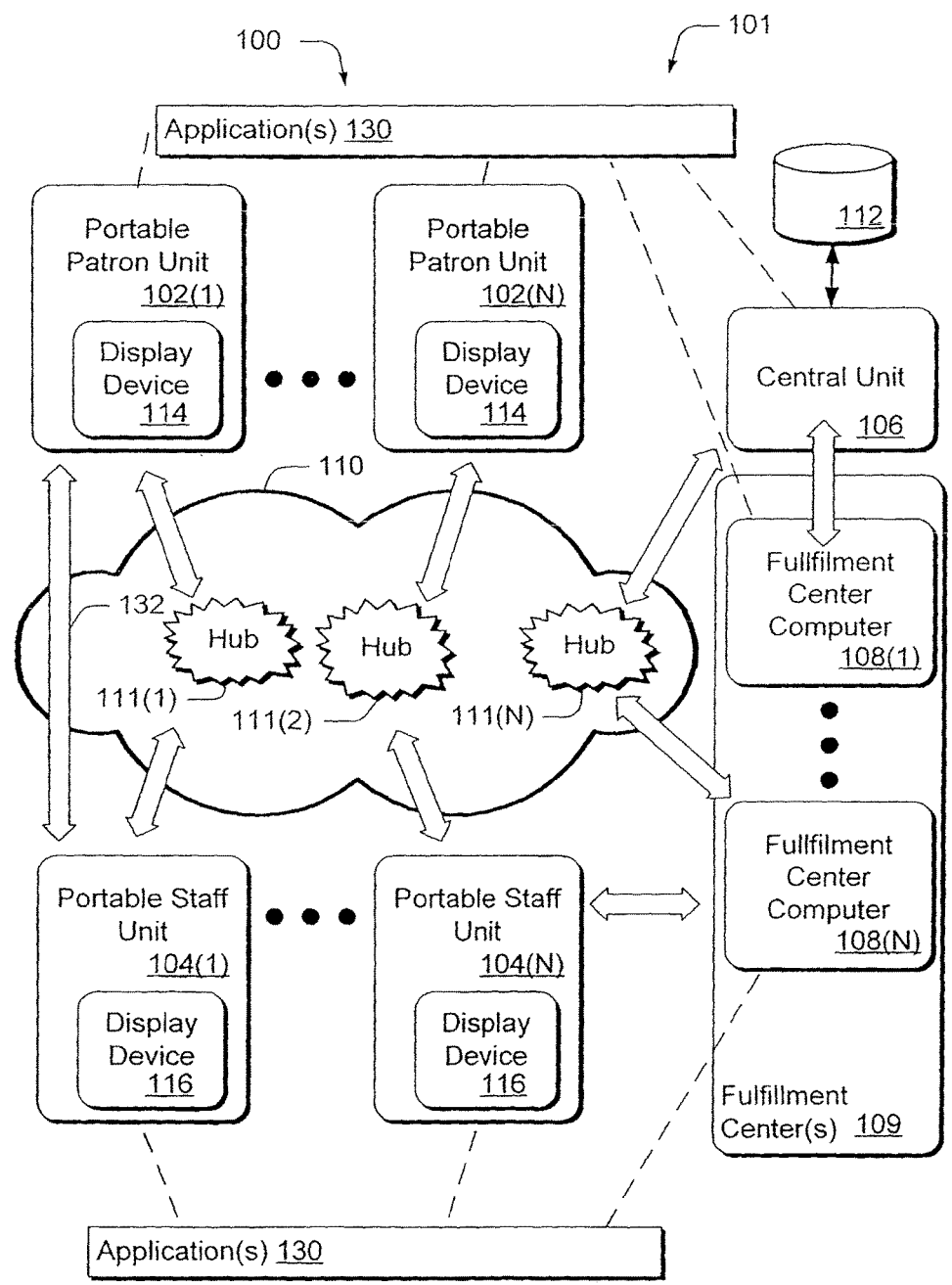
FIG. 1 is a block diagram illustrating an exemplary patron service system suitable for use in a resort.

FIG. 1 is a block diagram illustrating an exemplary patron service system 100 suitable for use in a resort 101. As used herein a "resort," refers to hospitality venues, such as, but not limited to, hotels, motels, lodging centers, cruise ships, tennis resorts, camps, ski resorts, relaxation centers, inns, time-share communities, retirement communities, and any constituent parts of a particular resort, such as, but not limited to, restaurants, bars, pools, tennis courts, entertainment centers, ski slopes, beaches, spas, boating facilities, gift shops, retail locations, and so forth.

Although patron service system 100 is described herein primarily in the context of being used in a resort, it should also be noted that patron service system 100 may be used in various other venues including, but not limited to, stadiums, arenas, retail locations, zoos, transportation centers, health care settings, convalescence centers, convention centers, country clubs, museums, gambling venues, sporting events, as well as any other entertainment, retail, and recreational environments.

In one implementation, patron service system 100 is configured to service one or more patrons and staff members of resort 101. Patron service system 100 may include one or more portable patron unit 102(1), ... , 102(N), one or more portable staff units 104(1), ... , 104(N), a central unit 106, and one or more fulfillment center computers 108(1), ... , 108(N). Patron service system 100 may form at least a portion of a network 110.

Portable patron unit, referred to generally as reference number 102, is provided to a patron to use at resort 101 while at a pool, beach, spa, deck, lounge, or any other areas associated with resort 101. Portable patron unit 102 is a rugged mobile computer device with an interactive display device 114. Portable patron unit 102 uses wireless technology to transmit and receive information from other devices associated with resort 101. Accordingly, from the comfort of the beach, a pool lounge chair, or other various locations, a patron may view extensive menus of items, services, information, etc. that may be ordered from a user interface displayed on display device 114 of portable patron unit 102. A patron may order food, beverages, services, and so forth, by entering information into their respective portable patron unit 102.

In one implementation, portable patron unit 102 may be attached with a secure locking mechanism (not shown) to a patron's lounge chair, table, and so forth by a staff member of the resort. Alternatively, portable patron unit 102 may be carried by the patron or may be affixed to their person such as to a belt or wristband.

Display device 114 typically displays a user interface (to be described in more detail), which is easy to use, yet allows a great degree of choice and flexibility in accessing information. The user interface is designed to require minimal training for the patron to begin using the system. The user interface may display extensive menus of items, services, information, etc. that can be ordered or accessed and may include descriptions, pricing information, or other details. Information, such as property announcements and promotions, weather conditions, activity updates, etc., may also be displayed to the patron at the discretion of resort 101.

The user interface may enable patrons to rapidly order standard menu items, while also allowing for extensive order customization. The user interface may also display items that the patron had previously ordered during the day or vacation period, making it easy to replicate previous orders (e.g., order "another round"). Daily specials, cross-sell, up-sell and other recommendations based on the patron's choices and any other sales and convenience features may be included in the user interface. The portable patron unit 102 may also display information relating to the status of any open order, open tab, etc. including the real-time status of any order and estimated time to that order's delivery.

A patron may also use portable patron unit 102 to page a staff member, to receive personal attention from the staff member, request immediate delivery of a bill, etc. Portable patron units may also receive an electronic bill, permitting patrons to enter credit card information, or other payment information without the need for a staff member to physically deliver the bill. Bills may also be generated automatically without the need for a bill request, depending on the system. Portable patron unit 102 may offer a patron the ability to play games, access the Internet, receive and send e-mail, conduct two-way conversations, watch videos, watch movies, listen to music, among other features. The ability to conduct two-way conversations may assist in allowing the patron or a staff member to better communicate with each other in the event there is a question about an order, such as with a custom meal order.

A portable staff unit, referred to generally as reference number 104, is a durable mobile computer device with an interactive display device 116 that uses wireless technology to transmit and receive information from other devices associated with resort 101, such as central unit 106. Portable staff unit 104 is provided to a staff member (such as a server, a runner, a waiter, a waitress, beach attendant, recreational staff, an employee and other personnel associated with an establishment (hereinafter "staff member")) of resort 101 enabling the staff member to service patrons. Portable staff unit 104 may display information on patrons, including order status, which then can be used to service the patrons effectively and efficiently. For instance, portable staff unit 104 is configured to receive notification of open orders made by a patron including details of one or more pending orders. The portable patron unit 104 is designed to be mobile and carried with the staff member, such as with a serving tray, on a wristband, or affixed to a belt, etc.

Portable staff unit 104 is capable of displaying information for the purpose of assisting the staff member to better service the patron. For instance, portable staff unit 104 may display a location of a particular portable patron unit 102. This feature may be useful in locating a patron that has placed an order or requested a service, so that a staff member can deliver the patron's order or service the request directly to the patron in an efficient and prompt manner. The portable staff unit 104 may also display information about the particular patron such as the patron's name, room number, previous orders, specific items ordered, billing status, preferences, special needs, and so forth. Such information may by useful to the staff member so they may address the patron by name and understand or anticipate the patron's needs, even without personally contacting the patron.

Portable staff units 104 may also assist a staff member by displaying real-time information or actions performed by patrons on their portable patron units 102 as they are being performed, such as displaying the number of patrons browsing on their portable patron unit 102, displaying particular activities performed by a particular patron, etc. Such real-time information may prepare a staff member for future orders not yet received and give the staff member a head start on an order even though the patron may not have completed and submitted the order.

Portable staff unit 104 may also receive page messages from a patron, indicating the name and location of a patron who requires immediate service or personal attention. Portable staff unit 104 may also be configured to perform all functions that a portable patron unit 102 can perform, such as placing an order, which allows a staff member to instantly transmit an order taken verbally if a patron prefers not to enter the order directly on the portable patron unit 102 or if a patron does not currently have a portable patron unit 102. A staff member can also "take over" an order from portable patron unit 102, and edit and transmit the order if a patron is having difficulty with the system.

In terms of billing status, portable staff unit 104 can display open tabs, and when a patron has requested delivery of their bill, which can eliminate one of the more frustrating waiting periods in a patron's experience. In addition, a staff member can use portable staff unit 104 to perform administrative and patron and service functions, such as transferring a patron to another portable patron unit 102 if, for example, the patron wishes to relocate from the beach to the pool and the portable patron unit is locked to a piece of furniture (assuming the patron does not simply carry the portable patron unit with them).

Central unit 106 is typically a server side computer, which controls wireless communication among portable patron units 102 and portable staff unit 104, and distributes content to portable patron units 102 and portable staff units 104. Central unit 106 also may serve as a gateway to other resort systems such as Point-of-Sale management software running on central unit 106 or other computers.

Central unit 106 typically receives and authenticates orders made by portable patron units 102 and then routes the orders to an appropriate fulfillment center computer 108(1), ..., 108(N) associated with a fulfillment center 109, such as a kitchen, bar, spa, gift shop, etc. Once the order is prepared, a staff member from the particular fulfillment center 109 alerts central unit 106, typically via a fulfillment center computer 108, which in turn alerts one or more portable staff units 104 that the order is ready for pickup and delivery to a patron. Central unit 106 also may transmit other information to the portable patron units 102 such as advertisements, messages, resort information, Internet access, and other information that may be transmitted in response to a patron's request or without a specific patron's request. Central unit 106 also may maintain a database 112 including data associated with a history of transaction data, patron preferences, patron profiles, and various other information.

One or more programmable software applications 130 may execute on central unit 106 (i.e., one or more servers) when handling and servicing requests from client devices, such as portable patron unit 102 and portable staff unit 104. Programmable software applications 130 may also reside on one or more client devices (such as portable patron unit 102, portable staff unit 104 and/or fulfillment center computer computers 108). As shall be described in further detail, components of programmable software applications 130 may be configured to perform any one of a variety of different services associated with patron service system 100. Examples of services include: login verification for patrons using portable patron units 102; notification to portable staff units 104 that an item ordered by a patron is ready for delivery from a fulfillment center 109 to a patron; maintaining one or more databases 112 associated with patron service system 100; routing orders to appropriate fulfillment centers; providing food and drink menus to particular portable patron units 102; enabling patrons to order different items; and so on. The services can be combined with each other and with other applications to build intelligent interactive experiences on both the portable patron units 102 and portable staff units 104.

Although only one central unit 106 is shown in the exemplary illustration, more than one central unit 106 may be deployed in patron service system 100. Additionally, some or all the functionality performed by central unit 106, may be performed in a distributed fashion by one or more portable patron units 102, one or more portable staff units 104, and/or one or more fulfillment center computers 108.

In one implementation, network 110 includes one or more \Vi-Fi (wireless fidelity) hubs 111(1), 111(2), ..., 111(N)

that are IEEE 802.11 standard protocol compatible, such as standard versions 802.11b, 802.11g, etc. Accordingly, portable patron units 102, portable staff units 104, central computer 106, and fulfillment center computers 108 may communicate with network HO wirelessly. Accordingly, portable patron units 102 and portable staff units 104 are configured to communicate with other devices wirelessly, allowing them to move freely in designated areas of an resort 101, such as the beach, pool, lounge, etc. Typically, these designated areas are located within a reception range of approximately 400 feet in any direction of the one or more wireless hubs (such as hubs 111(1), 111(2), . . . , 111(N), which are referred to as "hot spots."

Network 110 may also use one or more other types of wireless networks, such as Bluetooth compatible networks, or future technologies. Network 110 may also include a combination of wireless-based and wired/optical based communication links. For instance, portable patron units 102 and portable staff units 104 may use wireless links to receive and transmit data, whereas fulfillment center computers 108 may use wired or optical links to access and transmit data. Additionally, it may also be possible for various devices to communicate directly with other devices without using network 110 as a communication link. For example, it may be possible for portable patron unit 102(1) to communicate directly with portable staff unit 104(1) via a wireless link 132. Network 110 may also include access to other networks, such as the Internet.

Accordingly, portable patron units 102, portable staff units 104, central unit 106, and fulfillment center computers 108 are designed to either run or interface with one or more programmable software applications 130 that are programmable application components, that are reusable, and that interact programmatically over network 110 or through other communication links, typically through standard Web protocols, such as extensible markup language (XML), hypertext transport protocol (HTTP), and simple mail transfer protocol (SMTP). However, other means of interacting with over network 110 may be used, such as simple object access protocol (SOAP), remote procedure call (RPC) or object broker type technology.

Thus, patron service system 100 offers a comprehensive and integrated solution to meet the needs of both the patron and a resort. Patrons benefit from faster service, greater control over their service, increased convenience, and improved personalized attention. Resort 101 benefits from the ability to enhance the patron's experience and increase patron satisfaction, the opportunity to generate higher incremental revenues, and the savings from faster and more efficient operations.

Exemplary patron service system 100 is only one example of a computing system and is not intended to suggest any limitation as to the scope of use or functionality of the system. Neither should patron service system 100 be interpreted as having any dependency or requirement relating to any one or combination of components illustrated in the exemplary computing environment shown in FIG. 1.

Having introduced exemplary patron service system 100 and its environments, it is now possible to describe patron service system 100 in more detail.

Exemplary Portable Patron Unit

Figure 2:
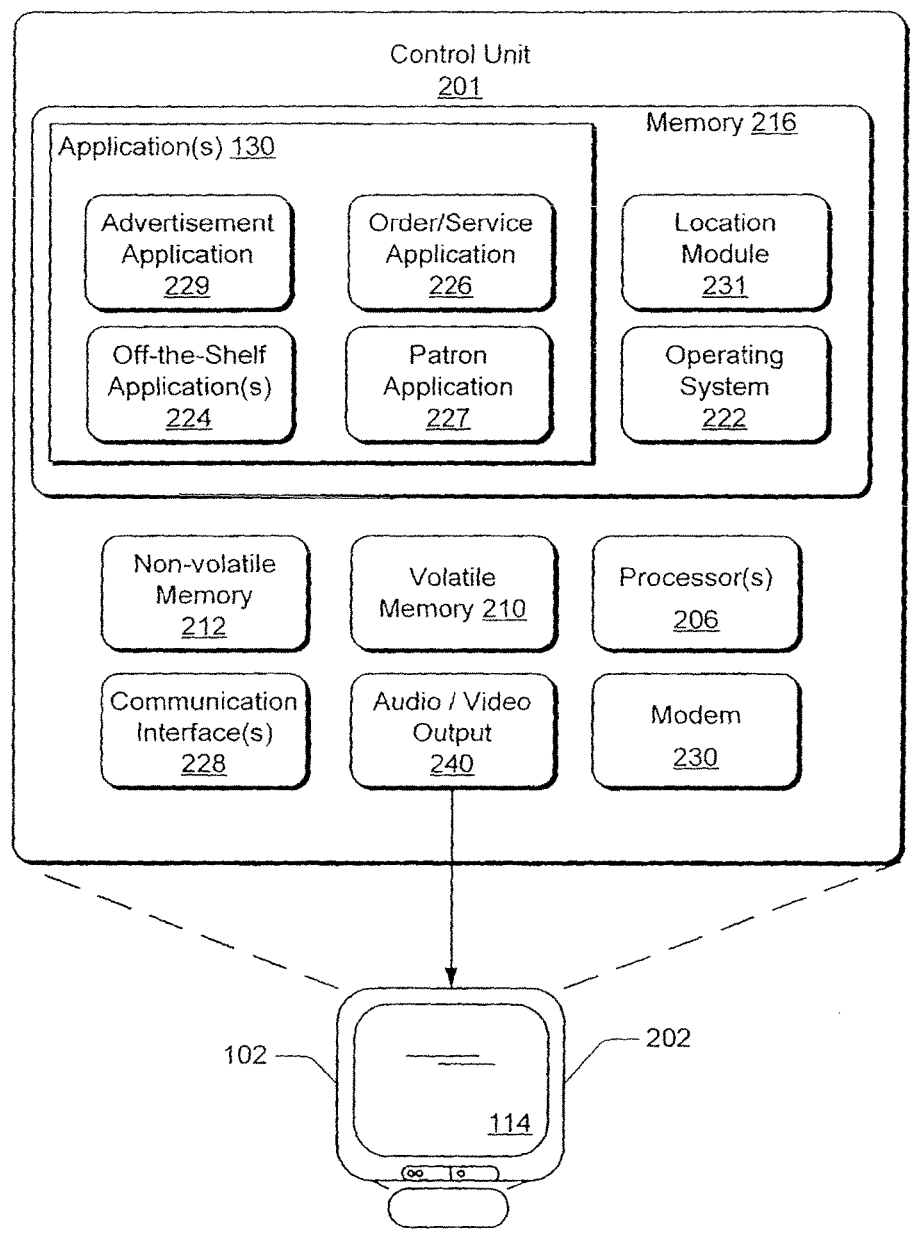
FIG. 2 illustrates an exemplary portable patron unit.

FIG. 2 illustrates an exemplary portable patron unit 102. Portable patron unit 102 is typically a handheld device that may be carried by a patron, attached to a patron's lounge chair, table, other furniture, or attached directly to the patron, such as the patron's belt or a wristband.

An outer protective casing, referred to as a packaging 202, is designed to be highly rugged, provide protection from the sun, saltwater, chlorine, sand, suntan lotion, spilled food, and/or drink. Such casing provides protection for any or all components of portable patron unit 102. Packaging 202 may be made of any number of materials including, but not limited to, plastic, metal, and/or wood. For example, in one implementation, packaging 202 is constructed of injection-molded high-impact polycarbonate designed to meet the EEC 529 IP 54 standards for water and dust/sand protection and may be configured into various shapes and sizes.

Portable patron unit 102 includes a display device 114, which in one exemplary implementation is a touch-screen display device, which enables a patron to select or enter information by simply touching the screen. To provide excellent visibility to a patron, information is typically displayed large enough on display device 114 to enable a person suffering from mild myopia to view content on display device 114 without the aid of corrective lenses. For example, in one implementation display device 114 is a five-inch grayscale QVGA transflective, backlit touch-screen LCD (liquid crystal display) and font sizes are displayed big enough to readily view them on display device 114. Additionally, magnifying materials (not shown) may be used in conjunction with display device 114 to enlarge content displayed therein. Various other types of display screens, sizes, and shapes may be chosen to implement display device 114. Additionally, display device 114 can be implemented without the benefit of touch-screen technology and rely on other types of input devices such as a keyboard, buttons, input pads, etc., to enter information into the portable patron unit 102.

Portable patron unit 102 also may include audio generators (such as one or more speakers not shown) for dissemination of audio content. The audio content may be in various forms and may be in conjunction with visual content.

Other elements such as lights, LEDs, batteries, power supplies, charging connections, microphones, vibrating devices, antennae and so forth are also not shown in FIG. 2, but may be a part of the exemplary portable patron unit 102.

Typically, portable patron unit 102 contains a control unit 201, which controls the operation of portable patron unit 102. Control unit 201 includes one or more processors 206 (e.g., any of microprocessors, controllers, and the like), which process various instructions to control the operation of portable patron unit 102 and to communicate with other electronic and computing devices.

Control unit 201 can be implemented with one or more memory components (i.e., memory 216), examples of which include volatile memory 210 (e.g., a random access memory (RAM) and the like), and a non-volatile memory 212 (e.g., ROM, Flash, EPROM, EEPROM, a hard disk drive, any type of magnetic or optical storage device, and the like). The one or more memory components store computer-executable instructions in the form of program applications, routines, modules and other applications. Additionally, various forms of information and/or data can be stored in volatile or non-volatile memory. Alternative implementations of control unit 201 can include a range of processing and memory capabilities, and may include any number of memory components other than those illustrated in FIG. 2. For example, full-resource portable patron units 102 can be implemented with substantial memory and processing resources, or low-resource portable patron units 102 can be implemented with limited processing and memory capabilities.

An operating system 222, such as Windows® CE operating system from Microsoft® Corporation or other operating systems, and one or more application programs 224 may be resident in memory 216 and execute on processor(s) 206 to provide a runtime environment. A runtime environment facilitates extensibility of portable patron unit 102 by allowing various interfaces to be defined that, in turn, allow application programs 130 to interact with control unit 201. The application programs 130 can include off-the-shelf program applications 224, such as a browser to browse the Web (e.g., "World Wide Web"), e-mail application to e-mail messages, and other off-the-shelf programs.

The application programs 130 can also include one or more other programs configured to provide resort specific user interfaces including menus and information directed to patrons. Such application programs may include: an order/service application 226, a patron application 227, and an advertisement application 229. Each of these patron oriented application programs typically executes on processor(s) 206 and may be stored in non-volatile memory 212 and/or volatile memory such as some form of volatile memory 210.

Order/service application 226 generally facilitates displaying interactive menus for ordering items, requesting services, and viewing information offered by resort 101 including viewing activities. Examples of items that may be ordered include, but are not limited to, food, beverages, rental equipment, and sundry items. Examples of services include, but are not limited to, requesting a bill, paging a staff person, scheduling a spa appointment, making a reservation, and so forth. Order/service application 226 also may facilitate displaying information associated with scheduling activities, which include but are not limited to, reserving a tennis court, reserving a tee time, requesting a boat, browsing and selecting tours, etc. Order/service application 226 also may prompt portable patron unit 102 to page a staff member when a patron selects a menu option, hard button, or other selection means, which activates a page mode.

Patron application 227 generally facilitates authenticating a patron's credentials/identification when logging onto the system or prior to submitting an order or a request. Authentication may involve requesting that the patron enter a security code or provide a biometric sample, such as a fingerprint as a security measure when logging onto the system or placing orders. Patron application 227 also may facilitate receiving or displaying personal preference information, needs, or requests of the patron. Preference information, needs, or requests may include, but are not limited to, dietary restrictions, medical needs, emergency contacts, and so forth. Patron application 227 may also facilitate receiving and viewing personal as well as general messages, such as a phone message left for a patron, or an announcement from resort 101 of a scheduling change, such as a buffet opening delay.

Advertisement application 229 generally facilitates displaying promotional messages and/or advertisements on display device 114. Advertisement application 229 may also facilitate displaying information such as cross-sell and/or up sell recommendations based on an item ordered and/or service requested by a patron. For instance, a cross-sell recommendation may include providing alternative or competing brands of food or drink, while an up sell recommendation may include offering a more expensive, promotional, or better quality food or drink as an alternative to what the patron may have selected.

Other applications, routines, programs and modules may execute on processor(s) 206. For instance, a location module 231 executes on processor(s) 206 and resides in memory 216 and/or volatile memory 210. Location module 231 is typically a background program that transmits information in the form of one or more signals to enable other devices to determine where portable patron unit 102 is located.

Additionally, other applications programs 130 operating in conjunction with control unit 201 of portable patron unit 102 may offer a patron the ability to play games, view and listen to music or videos, and conduct two-way conversations, etc., through one or more other application programs, routines, etc. For instance, with different storage offerings, games can be played from local memory 216 or from an online source provided by central unit 106 or via the Internet. Portable patron unit 102 may be configured to browse or access information from the Internet. Portable patron unit 102 also may include telephony access, such as Voice over Internet Protocol (VoIP) capability enabling a patron use the portable patron unit 102 to receive/make telephone calls, speak to other patrons or staff members, speak to a staff member in a fulfillment 109 and so forth.

Accordingly, application programs 130 (such as application programs 224, 226, 227, and 229), as well as module 231 execute on processor(s) 206 and can be stored as computer-executable instructions in memory of portable patron unit 102. Although application programs 224, 226, 227, 229, and module 231 are illustrated and described as single applications or module(s), each can be implemented as one or more combined component applications or modules, and can be fully or partially received from other devices, such as one or more servers (e.g., central unit 106).

For purposes of illustration, programs and other executable program components such as the operating system are illustrated herein as discrete blocks. However, it is recognized that such programs and components may reside at various times in different storage components of portable patron unit 102, or other components of patron service system 100, and may be executed by one or more processors that are not necessarily part of portable patron unit 102 (such as one or more processor(s) of central unit 106). Additionally, programs, such as application programs 224, 226, 227, 229, and module 231, are fully customizable.

Control unit 201 may further include one or more communication interfaces 228, such as a Wi-Fi PC card (not shown), which enables control unit 201 to receive and transmit information wirelessly using 802.11 compliant protocols. The Wi-Fi PC card in conjunction with control unit 201 collectively forms a wireless communication unit configured to connect the portable patron unit to network 110. Although not shown in FIG. 2, it is appreciated that one or more antennae are used to emit and transfer signals from portable patron unit 102. An optional modem 230 facilitates communication with other electronic and computing devices via a conventional telephone line, or other type of connection such as cable.

Control unit 201 may also include a content processor (e.g., processor(s) 206), which can include a video encoder and/or additional processors to receive, process, and encode recorded video signals including analog video signals, as well as television system digital video signals. For example, a content processor can include an MPEG-2 or MPEG-4 (Moving Pictures Experts Group) encoder that encodes MPEG video content and/or image data. The systems described herein can be implemented for any type of video encoding format as well as for data and/or content streams that are not encoded.

Typically, video content and program data includes video data and corresponding audio data. One or more other processors, such as processor(s) 206, may generate video and/or display content that is formatted for display on display device 114, and generates encoded/decoded audio data that is formatted for presentation by a presentation device, such as one or more speakers (not shown) in display device 114. Processor(s) 206 can include a display controller (not shown) that processes the video and/or display content to display corresponding images on display device 114. A display controller can include a graphics processor, microcontroller, integrated circuit, and/or similar video-processing component to process the images.

Control unit 201 also includes an audio and/or video output 240 that provides, or otherwise renders the audio, video, and/or display signals/data to display device 114. Video signals and audio signals can be communicated from control unit 201 to display device 114 via any suitable video links, such as a S-video link, composite video link, component video link, or other similar communication link.

Although shown separately, some of the components of control unit 201 may be implemented in an application specific integrated circuit (ASIC). Additionally, a system bus (not shown) typically connects the various components within control unit 201. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, or a Peripheral Component Interconnects (PCI) bus (also known as a Mezzanine bus).

Additional components may be included in portable patron unit 102 and some components illustrated in portable patron unit 102 above need not be included. For example, a camera (not shown) could be added to portable patron unit, and modem 230 may not be included.

Exemplary Portable Staff Unit

Figure 3:
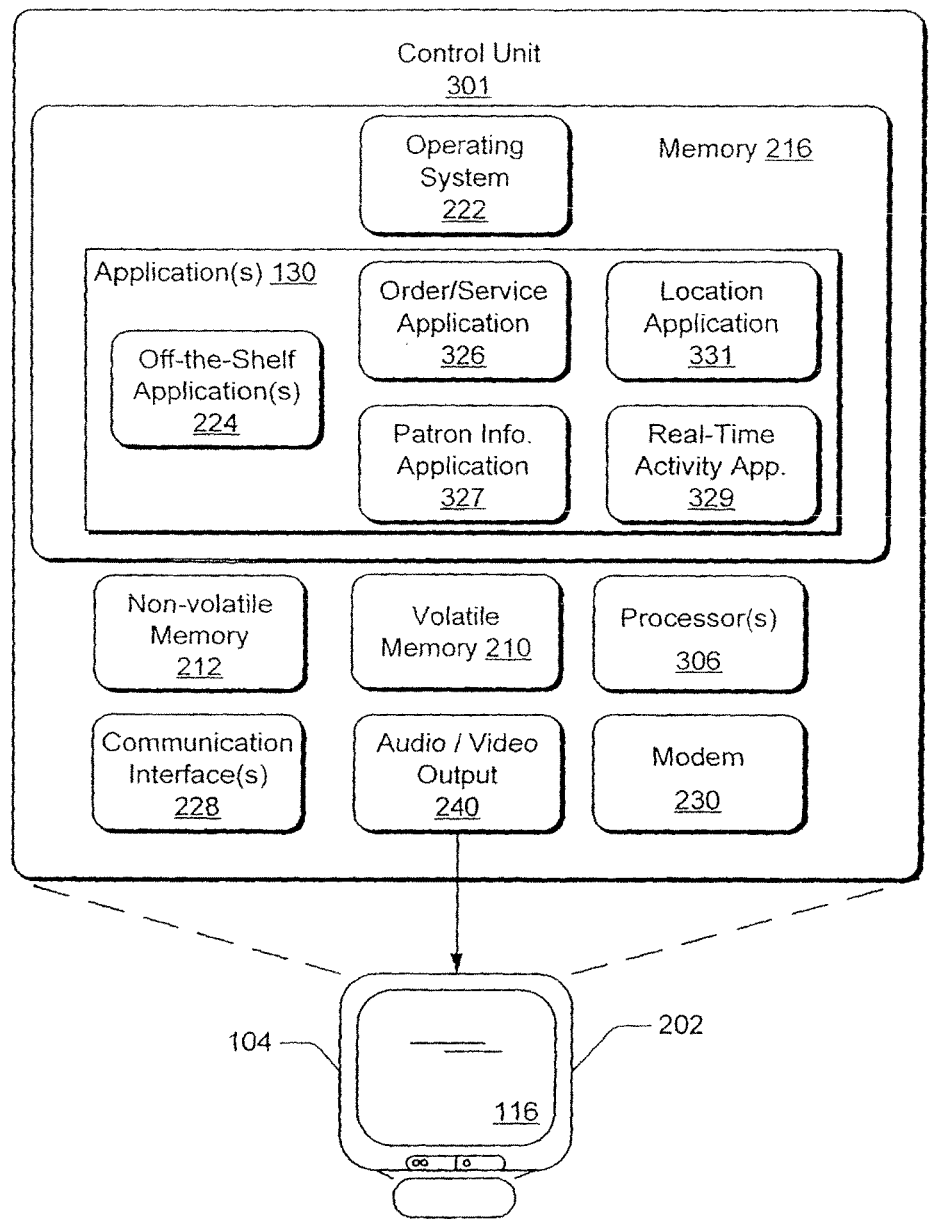
FIG. 3 illustrates an exemplary portable staff unit.

FIG. 3 illustrates an exemplary portable staff unit 104. Portable staff unit 104 may be similar or identical to portable patron unit 102 in terms of physical hardware and packaging. Portable staff unit 104, nevertheless, may be implemented in various shapes and sizes, and may be configured to mount on a waiter's tray or include handles (not shown) to enable enhanced portability when carrying portable staff unit 104.

Control unit 301 is similar to control unit 201 described above with reference to FIG. 2, and may use many of the same types of components. Control unit 301, however, may include different application programs 130 to provide a different runtime environment that is particularly suited for staff members of resort 101. For example, control unit 301 may include the following application programs 130: an order/service application 326; a patron information application 327; a real-time activity application 329; and a location application 331. Collectively, each of these program applications generate a user interface on display device 116 that enables a staff member to, for example, view details about a patron's order; determine a location of a portable patron unit; receive notification of when an order is ready for delivery and delivery to a patron; and view details about a patron, such as a room number, preference information of the patron and special needs or requests of the patron.

For example, order/service application 326 generally facilitates displaying details of an order and/or a request, such as items ordered or type of services requested by a patron. Order/service application 326 also facilities displaying a notification indicating (i) when an order or request is ready for delivery to a patron from a fulfillment center 109, or (ii) when a patron has requested delivery of a bill or paged a staff member.

Patron information application 327 generally facilitates displaying details about a patron, such as their name, room number, history, preferences, special needs/or personal requests, and so forth.

Real-time activity application 329 generally facilitates displaying actions performed by patrons as they use their portable patron units 102 in real-time. For example, real-time activity application 329 may display a description of actions performed by a patron selecting items from a food menu as the patron selects the items in real-time on his/her portable patron unit 102.

Location application 331 facilitates displaying real-time locations of a particular portable patron unit 102 to enable staff members to locate a particular patron when responding to a request or when delivering/serving an item.

Accordingly, application programs 130 (i.e., 224, 326, 327, 329, and 331) execute on processor(s) 306 and can be stored as computer-executable instructions in memory of portable staff unit 302. Although application programs 224, 326, 327, 329, and 331 are illustrated and described as single applications or module(s), each can be implemented as one or more combined component applications, and can be fully or partially received from other devices, such as one or more servers, (e.g., central unit 106).

For purposes of illustration, programs and other executable program components such as the operating system are illustrated herein as discrete blocks, although it is recognized that such programs and components reside at various times in different storage components of portable staff unit 104, or other components of patron service system 100, and may be executed by one or more processors that are not necessarily part of portable staff unit 104 (such as one or more processor(s) of central unit 106). Additionally, programs, such as application programs 224, 226, 227, 229, and module 231, are fully customizable.

Other elements such as lights, LEDs, batteries, power supplies, charging connections, microphones, vibrating devices, antennae and so forth are also not shown in either FIG. 2 or 3, but may be a part of the exemplary portable staff unit 104.

Exemplary Central Unit

Figure 4:
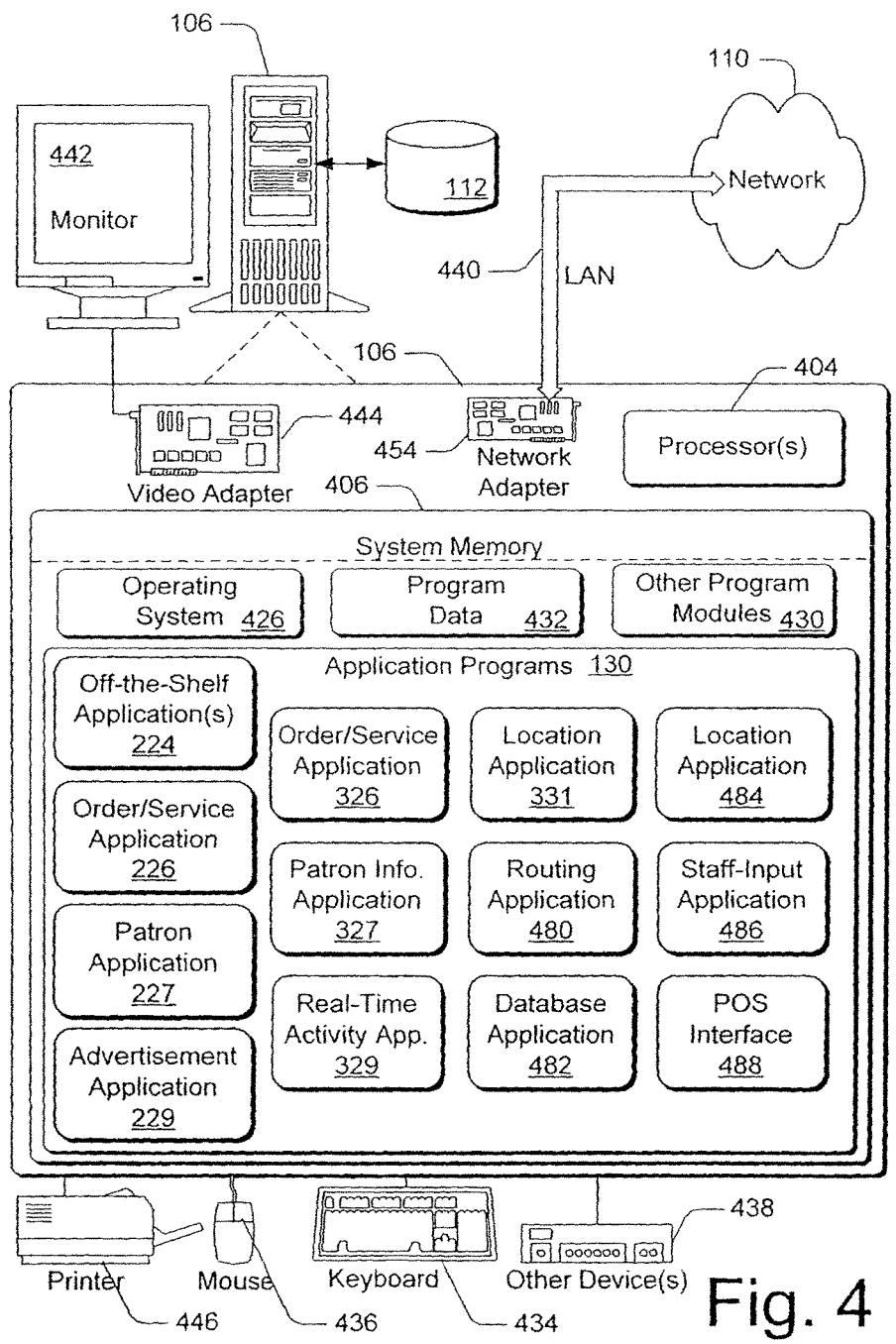
FIG. 4 illustrates an example of a central unit within which application programs and other functionalities described herein can be either fully or partially implemented.

FIG. 4 illustrates an example of a central unit 106 within which application programs 130 and other functionalities described herein can be either fully or partially implemented. Central unit 106 can be implemented with numerous other general purpose or special purpose computing systems and/or configurations that may be suitable for use including, but are not limited to, personal computers, server computers, multiprocessor systems, microprocessor-based systems, network PCs, minicomputers, mainframe computers, distributed computing environments that include any of the above systems or devices, and the like.

Application programs 130 may be described in the general context of computer-executable instructions, such as program modules, being executed by a computer. Generally, program modules include routines, programs, objects, components, data structures, etc. that perform particular tasks or implement particular abstract data types. Application programs 130 may also be practiced in distributed computing environments where tasks are performed by remote processing devices (e.g, portable patron units 102 and portable staff units 104) that are linked through a communications network or other network(s), such as network 110. In a distributed computing environment, program modules may be located in both local and remote computer storage media including memory storage devices.

The components of central unit 106 can include, but are not limited to, one or more processors (or processing units) 404 and memory 406. Although not shown, a system bus typically connects the various components within central unit 106.

Memory 406 represents a variety of computer readable media. Such media can be any available media that is accessible by central unit 106 (or processors 404) and includes both volatile and non-volatile media, removable and non-removable media. For instance, memory 406, may include computer readable media in the form of volatile memory, such as RAM and/or non-volatile memory, such as ROM.

Memory 406 can also include other removable/non-removable, volatile/non-volatile computer storage media. Such examples include a hard disk drive (not shown) for reading from and writing to a non-removable, non-volatile magnetic media (not shown), a magnetic disk drive for reading from and writing to a removable, non-volatile magnetic disk (e.g., a "floppy disk"), or an optical disk drive for reading from and/or writing to a removable, non-volatile optical disk (not shown) such as a CD-ROM, DVD-ROM, or other optical media.

Memory 406 and its associated computer-readable media provide non-volatile storage of computer readable instructions, data structures, program modules, and other data for central unit 106. Other types of computer readable media which can store data that is accessible by a central unit 106 can also be utilized to implement memory 406, examples of such include flash memory cards, CD-ROM, digital versatile disks (DVD) or other optical storage, random access memories (RAM), read only memories (ROM), electrically erasable programmable read-only memory (EEPROM), and the like.

Any number of program modules can be stored in memory 406, including by way of example, an operating system 426, one or more application programs 130, other program modules 430, and program data 432. Each of such operating system 426, one or more application programs 130, other program modules 430, and program data 432 (or some combination thereof) may include an embodiment of application programs 130. Memory 406 may also include one or more databases 112 containing data and information enabling functionality associated with application programs 130. In one implementation, operating system 426 includes the Windows® XP operating system from Microsoft® Corporation. Other operating systems may be resident in memory 406 such as UNIX and/or Linux.

A user can enter commands and information into central unit 106 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to processor 404 via interface and bus structures, such as a parallel port, game port, or a universal serial bus (USB). Staff members of a resort can enter programmable information into central unit 106 such as when updating and configuring menus, managing food and beverage menus, listing daily specials, defining serving zones of staff members, managing staff member assignments and deployment of portable staff units among staff members of resort 101, and other information to be displayed on either portable patron units 102 or portable staff units 104.

A monitor 442 or other type of display device can also be connected to the central unit 106 via an interface, such as a video adapter 444. In addition to the monitor 442, other output peripheral devices can include components such as speakers (not shown) and a printer 446 which can be connected to central unit 106 via input/output interfaces (not shown).

Central unit 106 can operate in a networked environment, or point-to-point environment, using logical connections to one or more remote computers, such as portable patron units 102, portable staff units 104, fulfillment center computers 108, network 110, hubs 111, and so forth. A network interface or adapter 454 may provide access to network 110, such as when network 110 is implemented as a LAN (local area network) 440 or WAN (wide area network).

In a networked environment, such as that illustrated in FIG. 4, program modules and program applications 130 depicted relative to central unit 106, or portions thereof, may be stored in a remote memory storage device. By way of example, application programs 130 may reside on a memory device in portable patron unit 102, portable staff unit 104, etc. For purposes of illustration, application programs and other executable program components, such as the operating system, are illustrated herein as discrete blocks, although it is recognized that such programs and components reside at various times in different storage components remote or locate, and are executed by processor(s) of central unit 106 or remote devices.

As mentioned above, memory 406 includes application programs 130 as well one or more databases 112. Application programs 130 that are utilized by both portable patron units 102 and portable staff units 104 (such as application programs 224, 226, 227, 229, 326, 327, 329, and 331) are generally managed and controlled by central unit 106. Database 112 generally includes data and information necessary to support application programs 130. For example, advertisement application 229 facilitates displaying promotional messages and/or advertisements on display device 114. Central unit 106 supplies the promotional messages and/or advertisements (the content) to portable patron units 102 in conjunction with advertisement application 229.

Accordingly, central unit 106 acts as a server to client devices such portable patron units 102 and portable staff units 104. In a server role, central unit 106 supplies content to portable patron units 102 and portable staff units 104. The content is stored in memory 406 in the form of data that may be maintained in one or more databases 112. In one implementation database 112 is maintained by a Microsoft's SQL server 2000, although other database management systems may be used, such as IBM's DB2 database software, or off-the-shelf database management systems from other companies such as Sybase, Informix, and so forth.

Memory 406 includes several application programs 130 particularly suited for central unit 106, and is used to potentially service other application programs or for providing management capability for central unit 106. For example memory 406 includes: a routing application 480, database application 482, a location application 484, a staff-input application 486, and POS interface 488.

Routing application 480 generally facilities receiving orders and/or requests from portable patron units 102 and routing them to a fulfillment center computer 108 responsible for handling the order and/or request.

Database application 482 generally facilitates storing and maintaining data in one or more databases 112. For instance, database application 482 may maintain menu items including descriptions of the items, prices, photos, etc. in database(s) 112. Database application 482 may also maintain a history of transaction data, patron preferences, etc. which can all be used for patron profile maintenance. Database application 482 may also maintain data associated with staff performance, such as the number of orders completed, time used to fulfill orders, etc. Typically, information maintained in one or more databases 112 may be accessed by various other program applications 130 when requested.

Location application 484 facilitates locating portable patron devices 102 based on signals emitted by its control unit 201. Location application 484 may JO use 802.11 location finding technology to determine locations of portable patron devices 102 and relay their positions to portable staff units 104. In one implementation, location application 484 uses positioning technology developed by Ekahau, Inc. of Helsinki, Finland, such as Ekahau Positioning Engine (EPE), which is a Java-based positioning program that provides location coordinates of portable devices such as portable patron units 102 and portable staff units 104. Utilizing EPE's engine would enable central unit 106 to determine the location of portable patron unit 102 accurate to within three and half feet of the unit's actual location both indoors and outdoors. Accordingly, once a portable patron unit 102 is logged onto the system 100 and emits a wireless signal to hubs 111, central unit 106 would then be able to track the location of the portable patron unit 102 in real-time. This information can then be relayed to one or more portable staff units 104, which display the patron unit's location on a map associated with any area or zone being served by the portable staff units 104. Alternatively, global positioning technology could also be used to track the location of portable patron units 102.

Staff-input application 486 enables staff members of resort 101 to enter information into central unit 106, such as daily specials, updates to menus, price changes, messages to staff members or patrons, security information, and so forth that is then stored in memory 406 (such as database 112) and may be utilized by applications 130.

POS interface application 488 facilitates integrating POS and hotel management systems with central unit 106. For instance, in one implementation interface application 488 includes Application POS Programming Interfaces (APIs) that may serve as an interface layer between POS interface application 488 and other POS and hotel management systems. Alternatively, direct interfaces may be used in the event API technology is not available with POS and hotel management systems.

Thus, application programs 130 (i.e., 224, 226, 227, 229, 326, 327, 329, 331, 480, 482, 484, 486, 488) may execute on processor(s) 404 and can be stored as computer-executable instructions in memory 406 accessible by central unit 106. Although application programs 130 are illustrated and described as single applications or module(s), each can be implemented as one or more combined component applications, and can be fully or partially received from other devices.

For purposes of illustration, programs and other executable program components such as the operating system are illustrated herein as discrete blocks, although it is recognized that such programs and components reside at various times in different storage components of central unit 106, or other components of patron service system 100, and may be executed by one or more processors that are not necessarily part of central unit 106.

It should be noted that central unit 106 may include other capabilities such as the ability to serve games, serve music, and/or videos to portable patron units 102. Central unit 106 may also act as an IP router switch enabling VoIP or Voice Over WiFi-capability between portable patron units 102 and other devices connected to network 110.

Exemplary System Operation

Figure 5:
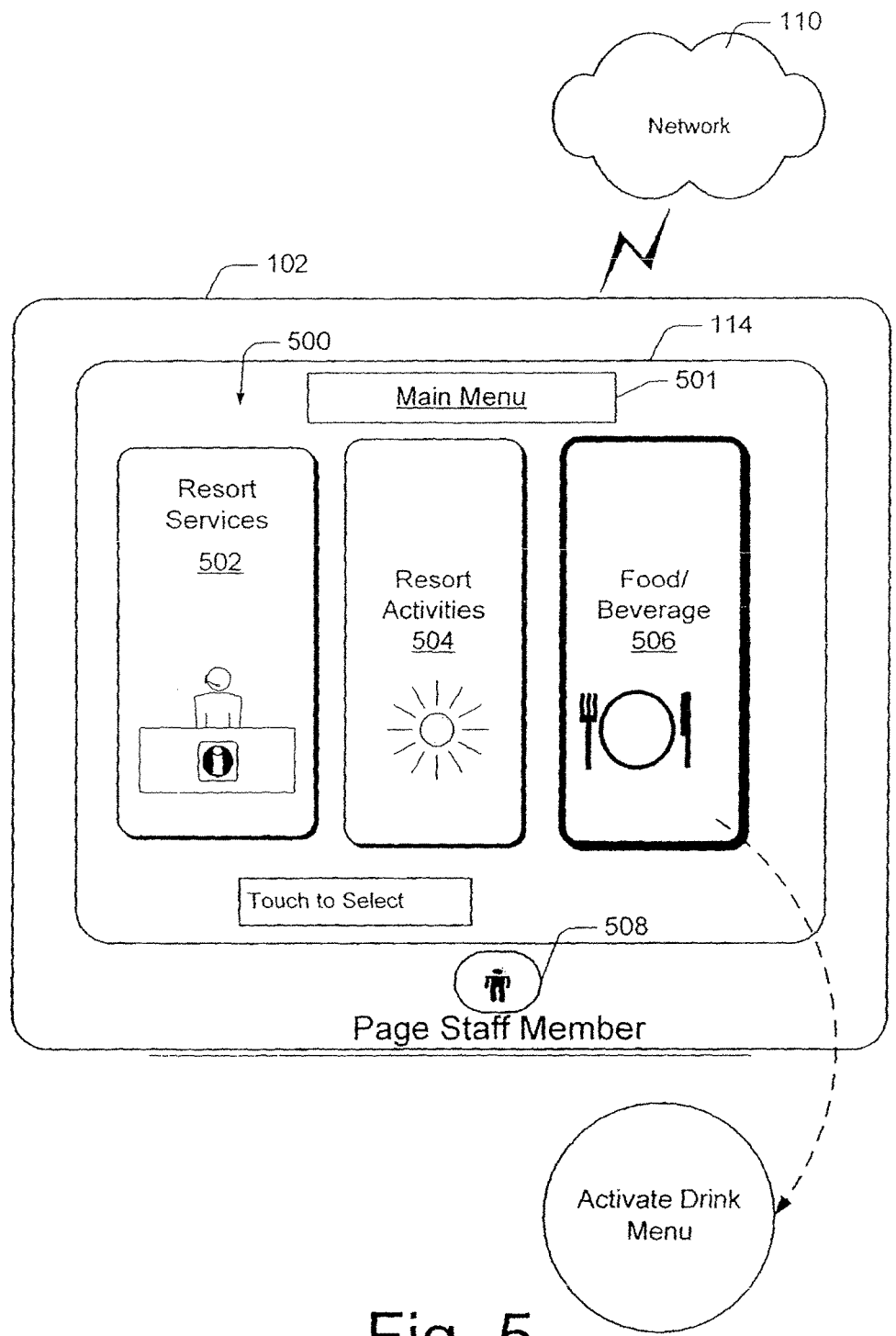
FIG. 5 illustrates an exemplary display screen rendered on a display device of a portable patron unit.

FIG. 5 illustrates an exemplary display screen 500 rendered on a display device 114 (FIG. 1) of portable patron unit 109. In particular, display screen 500 provides a user selectable menu, which enables the patron to browse information, request services, and/or order items as well as other functionalities. Display screen 500 forms part of a user interactive interface and includes a main menu 501 having selectable icons, such as a resort services icon 502, a resort activity icon 504, and a food/beverage menu 506. Selecting resort services icon 502 activates a mode of operation for portable patron unit 102 associated with order/service application 226 (FIG. 2), such as receiving information about the hotel, requesting non-food services, etc.

Selecting resort activities icon 504 activates a mode of operation also associated with order/service application 226 (FIG. 2) such as displaying information associated with scheduling activities, which may include reserving a tennis court, reserving a tee time, requesting a boat, browsing and selecting tours, scheduling a massage, etc.

Selecting food/beverage icon 506 activates a mode of operation also associated with order/service application 226 (FIG. 2) such as viewing a food or beverage menu, browsing nutritional information, ordering food or beverages, and so forth. As represented in FIG. 5, a patron has selected food/beverage icon 506. Accordingly, the next user interface to be displayed by control unit 201 (FIG. 2) will pertain to viewing food/beverage menus and/or ordering items associated with such menus.

Portable patron unit 102 may include a button 508, an icon (not shown) on display screen 500, or other related selection means such as a switch, key, etc., that provides a means for a patron to prompt portable patron unit 102 to wirelessly page a staff member for immediate service. For example, pressing button 508 causes portable patron unit to select a paging mode associated with order/service application 226 (FIG. 2).

Although only these three icons and button 508 are shown in FIG. 5, any combination of differing types of additional information can be included in display screen 500 to further enable a patron to interact with portable patron unit. For instance, display screen 500 may include additional icons associated with purchasing other products, viewing other information such as messages or browsing the Internet, conducting VOIP conversations, and so forth. Other selectable elements could be used, instead of, or in conjunction with icons such as a keypad/keyboard (not shown), a pointing device (not shown), and/or a mouse (not shown), etc. Additionally, one or more of the icons on display screen 500 may appear on other display screens/pages presented on display device 114. Accordingly, some or all of the icons may be displayed in different formats, in different screens, in different order, with different verbiage, etc.

Figure 6:
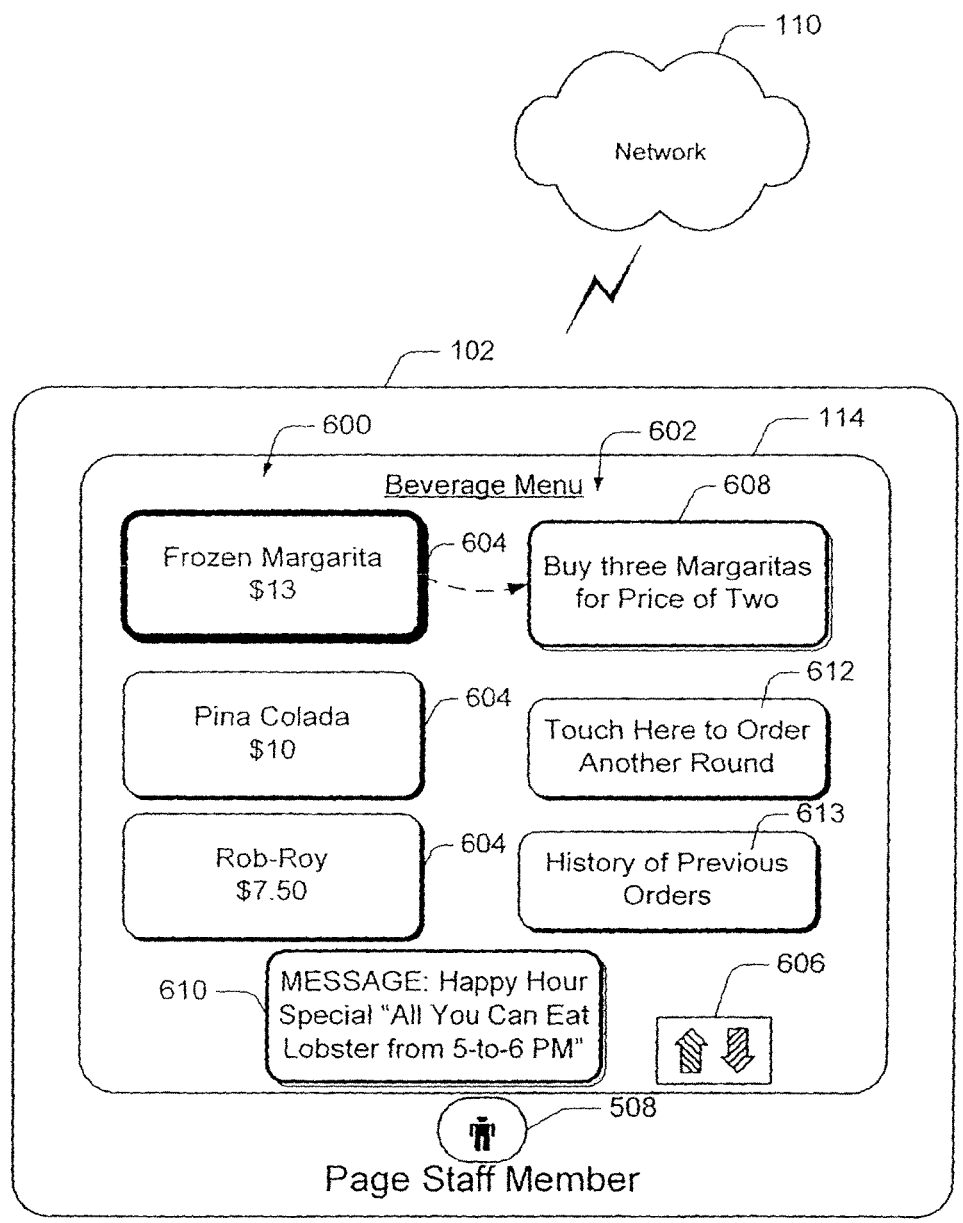
FIG. 6 illustrates an exemplary display screen presented to patrons on display device after selecting a beverage icon.

FIG. 6 illustrates an exemplary display screen 600 presented to patrons on display device 114 after selecting food/beverage icon 506 shown in FIG. 5 or maybe also after selecting a beverage menu icon (not shown). In particular, display screen 600 provides a user selectable menu, which enables the patron to browse information regarding and/or order items associated with ordering beverages. Control unit 201 facilitates display of display screen 600.

Display screen 600 includes an exemplary beverage menu 602 for ordering blended drinks that may be selected after selecting a mixed drink icon or button (not shown). Beverage menu 602 may be one of several menus that a patron can access after selecting food/beverage icon 506 and several intermediate food or beverage menus may be selected by a patron before arriving at beverage menu 602. Beverage menu 602 includes particular beverage icons 604, prices associated with the a particular beverage, and a selectable control 606 within screen 600 to generate different beverage selection screens, such as by manipulating arrows in a selectable control 606 or by other screen selection/manipulation means such as tabs, buttons, etc. Additionally, the beverage choices may be depicted in several display windows.

Also depicted in display screen 600 is an advertisement 608. Advertisements are generally generated by a mode of operation associated with advertisement application 229. The advertisement generation correlates (i.e. is appurtenant) to the item viewed or ordered by the patron, which in this example relates to buying three frozen margaritas for the price of two. The advertisement could also correlate to a service requested. Another advertisement 610 may be displayed in conjunction with advertisement 608 (although it may be displayed separately). In this example, advertisement 610 is a promotion message detailing a happy hour special. Although not shown in this example, the advertisement could also be displayed on display screen 600 or other screens to cross-sell and/or up sell recommendations based on an item ordered and/or service requested by a patron. For instance, a cross-sell recommendation may include providing an alternative or competing brand of margarita mix or an alternative type of alcohol. An up sell recommendation may include offering a more expensive, promotional, or better quality alcohol as an alternative to what the patron may have selected.

Order another round icon 612 allows a patron to automatically order another round of drinks or other items previously ordered by selecting icon 612. Selecting icon 613 may display items that the patron previously ordered during the day, making it easy to view previous order and order one or more items based on the logged history.

Although not shown, display screen 600 may also include selection items enabling a patron to customize orders, select condiments, select preparation method, select side dishes, etc. For instance, display screen 600 may display a flavor associated with a drink, the option to order the drink with or without salt, the option to order the drink with or without ice, and so forth. Each of the options presented typically relate to the item selected by the patron and can be tailored by a resort through the use of patron service system 100.

It is noted that display screen 600 is only one example of screens that may be used in association with ordering items or requesting services. Additionally, one or more of the icons present on display screen 600 may appear on other display screens presented on display device 114. Accordingly, some or all of the icons may be displayed in different formats, in different screens, in different order, with different verbiage, etc. It is also appreciated that one or more portions of screen 600 are customizable and may not be presented in certain implementations.

Figure 7:
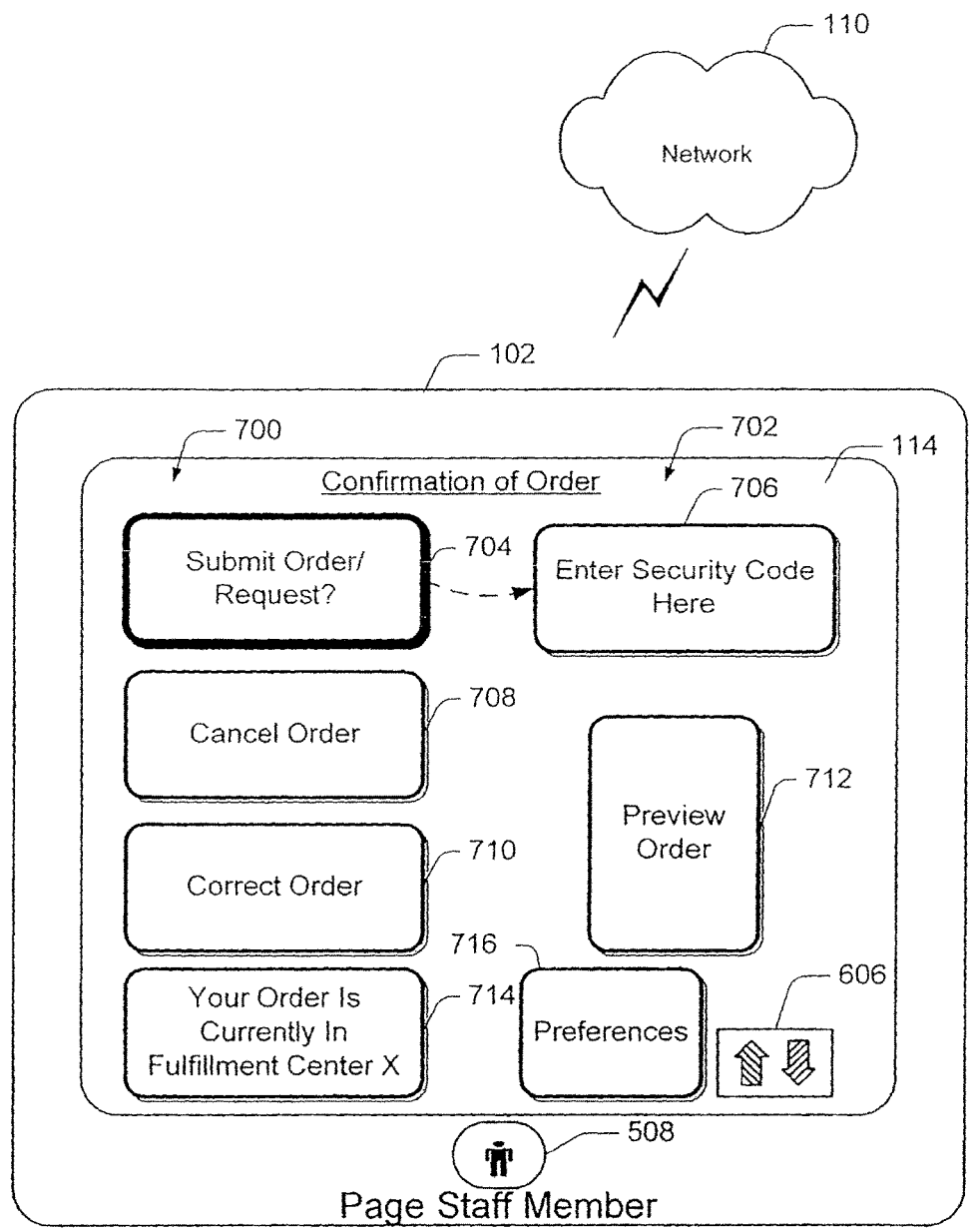
FIG. 7 illustrates an exemplary display screen presented to patrons when ordering a beverage item.

FIG. 7 illustrates an exemplary display screen 700 presented to patrons after selecting food/beverage items for order. In particular, display screen 700 provides a user selectable menu, which enables the patron to preview, correct or change selected items before actual submission of the order. Control unit 201 facilitates display of display screen 700.

Display screen 700 may includes confirmation information 702. For instance, once the item or service is chosen and a patron indicates completion of the selection by touching confirmation icon 704, the patron may be prompted to enter security, identification or other information before the order/request is processed such as via information block 706. This is to ensure that the patron is authenticated before the order/request is accepted. In one implementation, the information is entered into information block 706 by interacting with a touch-screen. Alternatively, in other implementations this information may be entered via a keypad (not shown), or by other means such as by biometrics.

The patron may preview an order before submitting it as via a preview area 712. To confirm the information displayed in preview area 712, the patron would select a "submit now" type of button or use some other tool or any other selection means. To cancel the order/request, the patron would select a cancel icon 708 or any other selection means. To correct or change information, the patron would select a correction icon 710 or any other selection means.

Display area 714 may indicate real-time information relating to a pending order. For example, display area 714 may indicate that an order is currently pending in the kitchen and thus is not available for delivery by a waiter yet. Using display area 714, a patron may be kept abreast of the status of his order in real-time.

A preference icon 716 may also be presented to a patron enabling a patron to input or view preference information associated with the patron including: special needs/requests of the patron; dietary restrictions; medical needs; and/or information associated with the patron from prior visits to resort 101.

FIG. 7 is only an example screen. Some or all of the icons may be displayed in different formats, in different screens, in different order, with different verbiage, etc. Portions of display screen 700 are optional and may not be presented in certain implementations.

Figure 8:
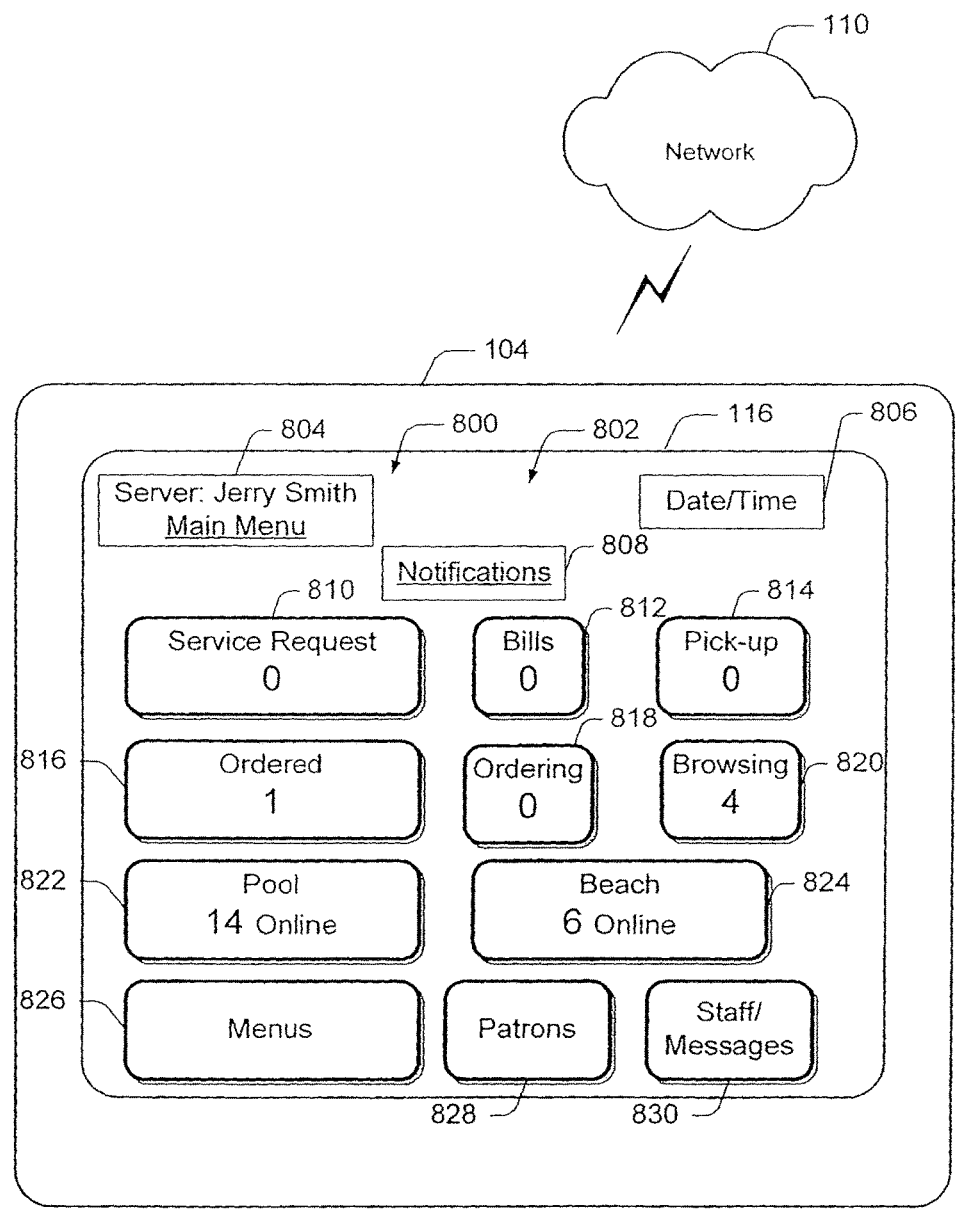
FIG. 8 illustrates an exemplary display screen rendered on a display device of a portable staff unit.

FIG. 8 illustrates an exemplary display screen 800 rendered on a display device 116 (FIG. 1) of portable staff unit 104. Display screen 800 is used by staff members to view notifications 808 and other information associated with servicing patrons. For instance, in one implementation, display screen 800 includes selectable icons 802 (e.g., 810, 812, 814, 816, 818, 820, 822, 824, 826, 828, and 830), some of which display dynamic information. Dynamic information that a staff member may view on display screen 800 may include a quantity of patrons currently logged onto the system, the quantity of orders pending, the quantity of patrons located in certain areas of the resort, a quantity of patrons having requested their bills, a quantity of patrons currently preparing orders, and the quantity of patrons browsing on their portable patron units, etc. Control unit 301 facilitates display of display screen 800.

Display screen 800 may include an icon listing the name of a staff member 804 recognized by patron service system 100 as using this particular portable patron unit 104. Display screen 800 may also include a date and time bar or icon 806.

Display screen 800 may include a service request icon 810 indicating the quantity of patrons with a pending service request. The service request may involve a page from a patron for immediate service, or some other type of service offered by resort 101 to patrons. To ascertain details about one or more requests, the staff member would select icon 810 (i.e., touch icon 810), which would prompt a window or new display screen to appear on display device 116 that would describe specific details of the request.

Display screen 800 may include a bill request icon 812 indicating the quantity of patrons with a pending bill request. If the bill request was pending, the staff member would select icon 812, which would prompt a window or new display screen to appear on display device 116 that may describe which patrons are requesting their bill, further details about bills, patron identification, itemized information, payment methods, etc.

Display screen 800 may include a delivery notification icon 814 indicating how many orders are ready for delivery in fulfillment centers 109. If an order was ready for delivery, the staff member could select icon 814, which would prompt a window or new display screen to appear on display device 116 that would describe which orders were ready for delivery, and details of the orders, such as the fulfillment center 109 location of the prepared orders, the identification of the patron waiting to receive the order.

Display screen 800 may also include an ordered notification icon 816 indicating how many non-service orders are pending. To ascertain details about the order, the staff member may select icon 816, which would prompt a window or new display screen to appear on display device 116 that would describe specific details about the pending order.

Display screen 800 may include a real-time ordering notification icon 818 indicating how many patrons are currently ordering items. If a patron were in the process of making an order, the staff member could select icon 818 which would prompt a window or new display screen to appear on display device 116 enabling the staff member to view actions performed by the patron as they are performed by the patron in real-time when making an order.

Display screen 800 may include a browsing notification icon 820 indicating how many patrons are currently browsing information on their portable patron units 102. To view what a certain patron is browsing, the staff member may select icon 820, which may prompt a window or new display screen to appear on display device 116 that would show or list details about the patron's activities in real-time.

Display screen 800 may include a pool-online icon 822 indicating how many patrons are logged onto patron service system 100 and are located at the pool. In the exemplary illustration, 14 patrons are actively on-line. To ascertain details about the patrons on-line, such as their names, exact locations, and so forth, the staff member may select icon 822 (i.e., touch icon 822), which would prompt a window or new display screen to appear on display device 116 describing details about the patrons using portable patron units located around the resort's pool.

Display screen 800 may include a beach-online icon 824 indicating how many patrons are logged onto patron service system 100 and are located at the beach. In the exemplary illustration, six patrons are actively on-line. To ascertain details about the patrons on-line, such as their names, locations, and so forth, the staff member may select icon 824, which would prompt a window or new display screen to appear on display device 116 describing details about the patrons using portable patron units located on the beach.

Display screen 800 may include a menu icon 826, which when selected may prompt a window or new display screens enabling staff-members to view food and beverage menus. Accordingly, a portable staff unit 104 can perform ordering functions like a portable patron unit 102, such as placing an order, which allows staff members to instantly transmit an order taken verbally such as where a patron prefers not to enter the order directly on their portable patron unit 102. Menu icon 826 may also enable a staff member to "take over" an order from portable patron unit 102, edit and transmit the order, such as where the patron is having difficulty with the system.

Display screen 800 may include a patron icon 828, which when selected would prompt a window or new display screens enabling staff-members to view information about particular patrons.

Display screen 800 may include a staff/messages icon 830 that may flash or light-up indicating that the staff member has received a message or been paged. To ascertain details about the message, the staff member may select icon 830, which would prompt a window or new display screen to appear on display device 116 that describes details about the message. When a message is received, portable staff unit 104 may also vibrate or ring to alert the staff member of the message.

FIG. 8 is only an example screen. Some or all of the icons may be displayed in different formats, in different screens, in different order, with different verbiage, etc. Portions of display screen 800 are optional and may not be presented in certain implementations.

Figure 9:
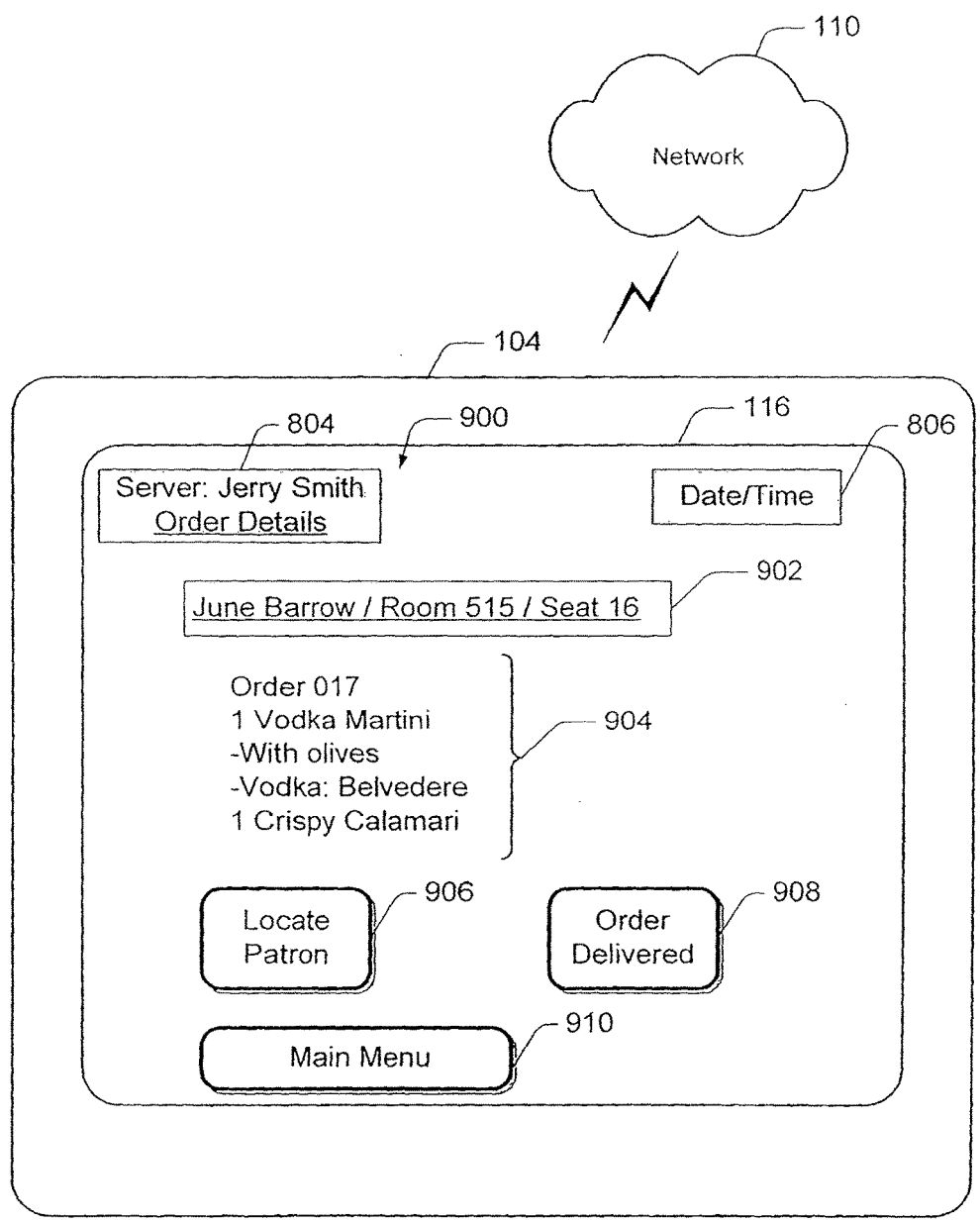
FIG. 9 illustrates an exemplary display screen providing details about an order to a staff member.

FIG. 9 illustrates an exemplary display screen 900 providing details about an order to a staff member. Display screen 900 is typically prompted after a staff member selects ordered icon 816. Display screen 900 may include information identifying the patron (902), such as the patron's name, room number, and seat-number (such as at a pool or in a restaurant or any other location information). Additional information may be provided, including a patron's preferences, history, special requests, medical requests, etc. Display screen 900 may also specify items ordered 904 such as a type of liquor, brand of water, etc. Control unit 301 (FIG. 3) facilitates display of display screen 900.

A staff member may quickly locate the patron by selecting locate patron icon 906, which may prompt a map associated with resort 101 and the location of the portable patron unit 102 used by the patron.

Once an order is delivered to a patron, a staff member may press order delivered icon 908, which prompts portable patron unit 104 to send a message to central unit 106 closing out the open order. A staff member may also return to the main menu by selecting icon 910.

It should be appreciated that FIG. 9 is only an example screen. Some or all of the icons may be displayed in different formats, in different screens, in different order, with different verbiage, etc. Portions of display screen 900 are optional and may not be presented in certain implementations.

Figure 10:
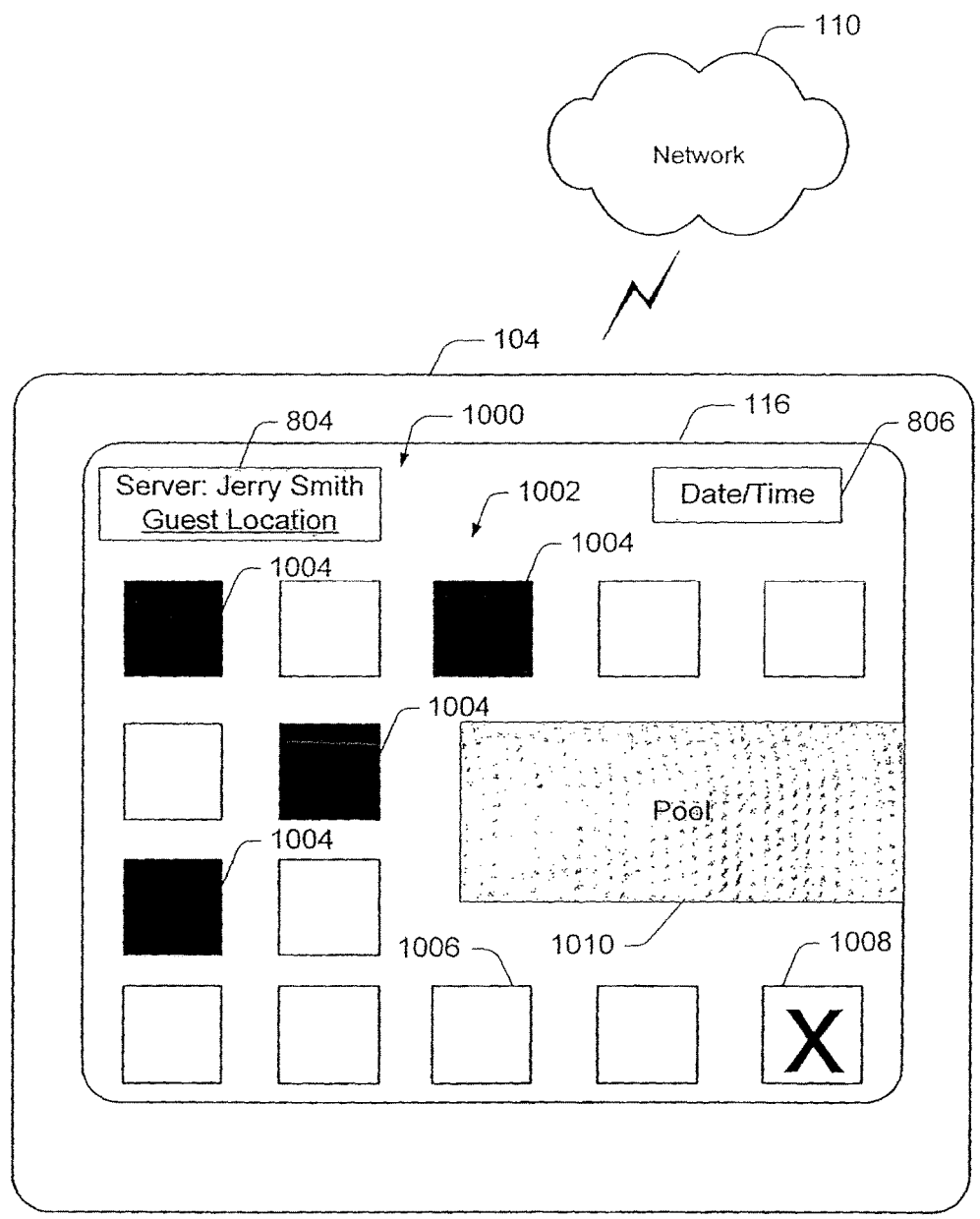
FIG. 10 illustrates an exemplary display screen on a portable staff unit for displaying locations of portable patron devices.

FIG. 10 illustrates an exemplary display screen 1000 on portable staff unit 104 for displaying locations of portable patron devices. In this example, display screen 1000 is typically prompted after a staff member selects locate patron icon 906 (FIG. 9). Display screen 1000 may include a map 1002 associated with resort 101 and the location of the portable patron units 1002 indicated by dark blocks 1004, although other shapes, descriptions, etc., may be used to indicate locations of a patron, such as text, circles, blimps, and various other indicia. Non-shaded blocks, such as block 1006, indicate empty positions not occupied by portable patron unit 102, although any other item may be used to identify an empty position. Block 1008 includes an identifier, such as an X, which indicates a precise location of a particular portable patron unit 102 that has requested a service and/or an order that is to be delivered. Other identifiers may be used to indicate the relative location of a portable patron unit 102, or lack thereof, such as a bulls-eye, an arrow, a flashing block, and various other indicia. Pinpointing the location of a patron enables efficient and effective service of mobile patrons while in any areas of a resort. The relative location of the portable patron unit 102 can be dynamically displayed in real-time as the patron moves from one area of resort 101 to another area of resort 101, such as from the beach to the pool 1010.

FIG. 10 is only an example screen. Some or all of the icons may be displayed in different formats, in different screens, in different order, and with different verbiage, etc. Portions of display screen 1000 are options and may not be presented in certain implementations. Control unit 301 facilitates display of display screen 1000.

Methods for Patron Service System

Methods for patron service system 100 may be described in the general context of computer-executable instructions. Generally, computer-executable instructions include routines, programs, objects, components, data structures, etc. and the like that perform particular functions or implement particular abstract data types. The described methods may also be practiced in distributed computing environments where functions are performed by remote processing devices that are linked through a communications network. In a distributed computing environment, computer-executable instructions may be located in both local and remote computer storage media, including memory storage devices.

Figure 11:
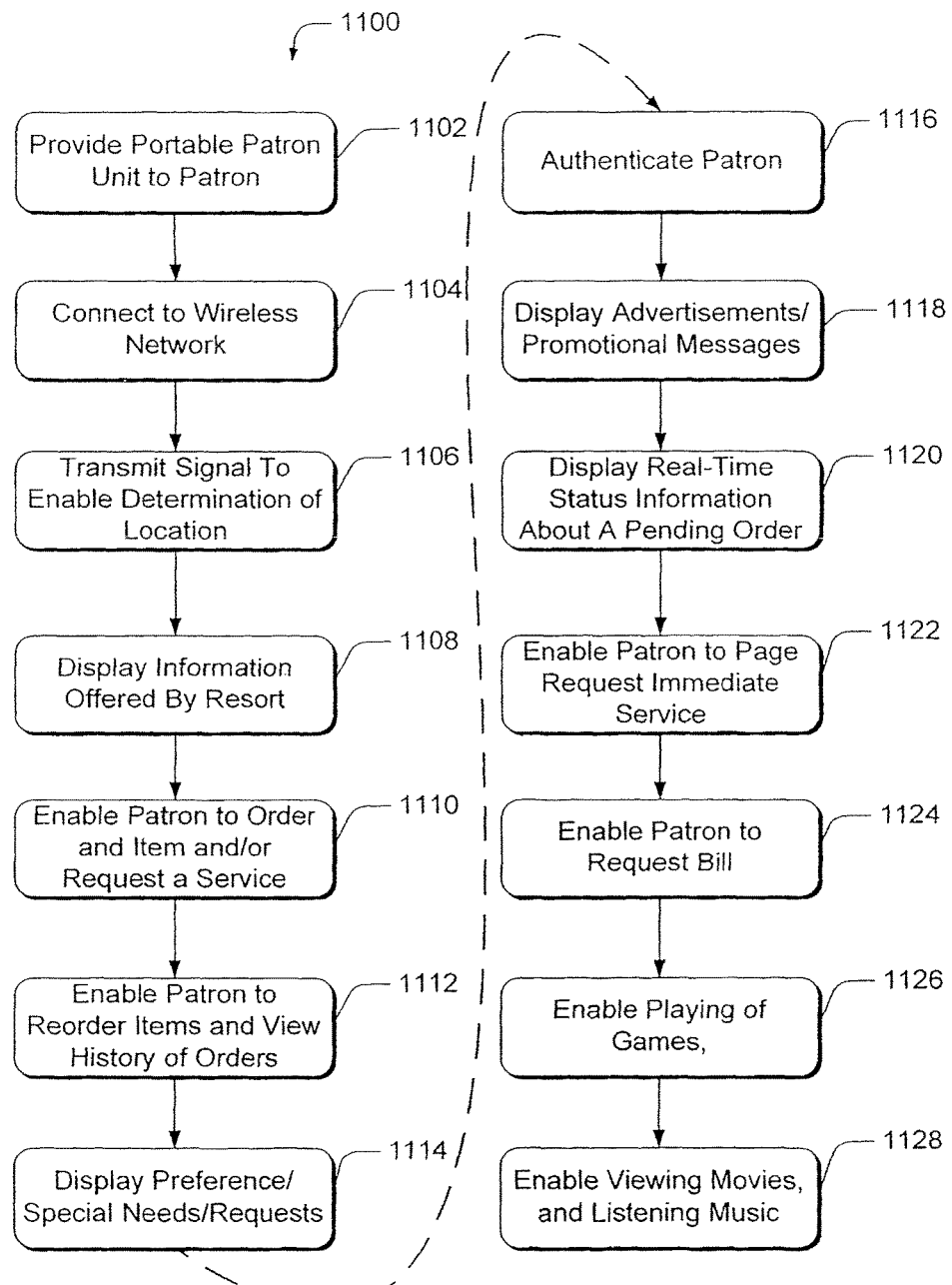
FIG. 11 is a flow diagram that illustrates an exemplary method of operation associated with a portable patron unit.

FIG. 11 is a flow diagram that illustrates an exemplary method 1100 of operation associated with portable patron unit 102. The order in which the method is described is not intended to be construed as a limitation, and any number of the described method blocks can be combined in any order to implement the method. Each of the operations and blocks may be optional and do not necessarily have to be implemented. Furthermore, the method can be implemented in any suitable hardware, software, firmware, or combination thereof. Exemplary method 1100 includes blocks 1102 through 1128.

In block 1102, portable patron units are provided to patrons at a resort, stadium/arena, or other establishments. For example, in a resort environment, a portable patron unit 102 maybe provided to a patron at check-in, at various areas of the resort, such as arrival at a beach or pool area. The portable patron units may be fastened and locked to a chair, lounge, table, etc. Alternatively, patrons may carry the portable patron units.

In block 1104, the portable patron unit is powered-on and connects wirelessly to a wireless network. For example, portable patron unit 102 connects to network 110 and is recognized by central unit 106. A staff member of resort 101 may enter a patron's room number using display device 114, verify the patron's name as displayed on display device 114 as retrieved from database 112 or another memory device such as a resort's Property Management System interface (not shown). At this point, the patron may choose a pin security code and verify the pin code for security purposes.

In block 1106, the portable patron unit transmits signals wirelessly that enable one or more other devices to determine the location of the portable patron unit. For example, central unit 106 may receive coordinate information from network 110 based on calculations made from a signal received from the portable patron unit 102 with respect to and through one or more hubs 111. This coordinate information may be translated by the central unit 106, mapped to locations associated with resort 101, and sent to other devices (such as portable staff units 104) for display to enable staff members to locate the portable patron unit.

In block 1108, information (also referred to as content) is displayed on portable patron unit 102. The information may include a user interface, display screens including menus, main menus, food and beverage menus, sub-menus associated with the main menus or food and beverage menus, such as specific drinks, appetizers, sandwiches, etc. The menus may offer the patron the ability to select a quantity of items desired, prices, selection of condiments, selection of side dishes, preparation methods, and so forth. A server side device, such as central unit 106, typically supplies the information (i.e., content) to portable patron unit 104.

In block 1110, a patron may order items and/or request services via a portable patron unit 102 and transmit the order/request wirelessly to the network or directly to other devices via a point-to-point wireless connection. For example, a patron may order items and/or request services via a user interface on display device 114 of portable patron unit 102 and transmit the order/request wirelessly to network 1110. When the patron is satisfied with an order and/or request, the patron may press an icon or button, or other related mechanism, to transmit the order/request.

In block 1112, if the patron has placed previous orders, the patron can access information about the previous order and can re-order any or all of the items. For example, a patron may select previously ordered icon 612 (FIG. 6) to automatically order another round of drinks.

In block 1114, the patron may view preferences, special needs, or special requests displayed on the portable patron device. For example, portable patron unit 102 may display preference information, special needs/requests, and information from prior visits. Additionally, the patron 102 may enter preference information, special needs/requests and information into the portable patron unit 102 for future reference by central unit 106 or other devices associated with resort 101.

In block 1116, prior to submitting or accepting an order the portable patron unit may request that the patron enter security information such as a PIN code previously selected and entered in to the system by the patron. This information is then verified and authenticated. Alternatively, other authentication measures could be performed.

In block 1118, advertisements or promotional messages are displayed. The advertisements or promotional messages may be generated in response to items or services requested by the patron. For example, recommendations, promotions, and featured items can be displayed based on items selected by the patron. The advertisements or promotional messages may include displaying cross-sell and/or up-sell recommendations based on the items ordered and/or services requested by the patrons. The advertisements may not be related to any response or action performed by a patron.

In block 1120, real-time status information about a pending order may be displayed. For example, a display area 714 (FIG. 7) may be generated on portable patron unit 102 providing real-time information relating to a pending order or request for service.

In block 1122, paging a staff member or requesting immediate assistance is enabled. For example, a patron may select a "call service" type button, icon, or related mechanism, which prompts portable patron unit 102 to page a staff member for immediate assistance.

In block 1124, bill requests are enabled. For example a patron may select a button, icon, or related mechanism, which prompts portable patron unit 102 to transmit a wireless signal requesting delivery of a bill. Alternatively, the patron may receive a virtual bill (i.e., electronic bill) on the display device 114 and approve payment of the bill without the assistance of a staff member.

In block 1126, interactive games may be offered to patrons. For example, interactive games may be selected and played on the portable patron units 102, including games that utilize the Internet. Additionally, telephony access may be provided to patrons, such VoIP or voice over WIFI capability.

In block 1128, movies, music and static photos may be offered and generated for the patron via portable patron unit 102. For example, portable patron units 102 are capable of displaying movies, playing music, displaying photos, etc.

It is noted that the patron can press a touch-screen button to end a session and logoff network 110, or the portable patron unit may automatically power down and logoff the patron after period of time.

It is also noted that program applications 130 such as off-the-shelf application(s) 224 (FIG. 2), order/service application 226 (FIG. 2), patron application 227 (FIG. 2), advertisement application 229 (FIG. 2) as well as location module 231 executing on processor(s) 206 (FIG. 2) and 408 (FIG. 4) and stored in memory 216 (FIG. 2) and 406 (FIG. 4) memory, may be implemented to perform one or more portions associated with method 1100.

Accordingly, program applications 130 generate menus, user interfaces, guides, screens, etc. for display which enable a patron to navigate and perform activities, order items, request services, browse information (locally or remotely via the Internet), view movies, play and view interactive game selections, view and play music selections, conduct voice conversations, etc. Application programs 130 also enable a patron's transactions to be processed.

Figure 12:
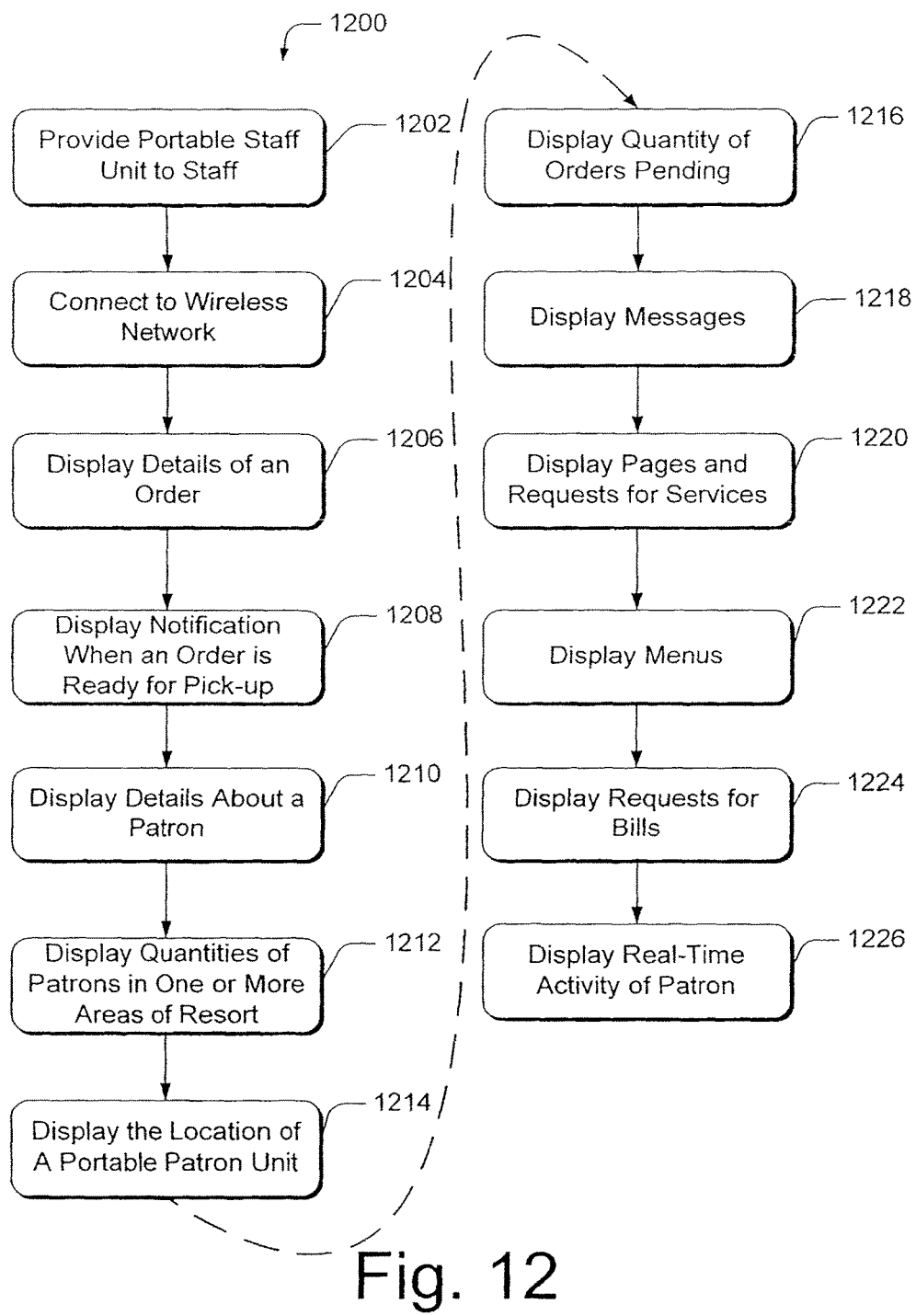
FIG. 12 is a flow diagram that illustrates an exemplary method of operation associated with portable staff unit.

FIG. 12 is a flow diagram that illustrates an exemplary method 1200 of operation associated with portable staff unit 104. The order in which the method is described is not intended to be construed as a limitation, and any number of the described method blocks can be combined in any order to implement the method. Some of the operations and blocks may be optional and do not necessarily have to be implemented. Furthermore, the method can be implemented in any suitable hardware, software, firmware, or combination thereof. Exemplary method 1200 includes blocks 1202 through 1226.

In block 1202, portable staff units are provided to staff members at a resort, stadium/arena, or other establishments. For example, in a resort environment a portable staff unit 104 maybe provided to a waiter for use in a pool area, to another waiter servicing the beach, and so forth. Staff members may carry the portable staff units 104.

In block 1204, the portable staff unit is powered-on and connects to a wireless network. For example, portable staff unit 104 connects to network 110 and is recognized by central unit 106. At this point, the portable staff unit may be logged onto network 110. Security authentication procedures may be performed when logging portable staff units 104 onto network 110.

In block 1206, details about an order or request are displayed. For example, details of items associated with an order are displayed on display device 116 of portable staff unit 104.

In block 1208, notifications indicating when an order or service request is ready for pickup from a fulfillment center 109 and delivery to a patron are received and displayed. For example, portable staff unit 104 receives notifications wirelessly that a patron's order (or potentially a service request) is ready for delivery and delivery to a patron. The notifications may be sent directly from fulfillment center computers 108 or via central unit 106. Once an order is delivered, the order may be closed by touching a button or other means of selection on portable staff unit 104 to indicate that the order has been delivered.

In block 1210, details about a patron may be rendered and displayed. For example, portable staff unit 104 may display details about a patron including the patron's room number, preference information, special needs/requests, information associated with prior visits, notes made by other staff members about the patron, and so forth.

In block 1212, the number of patrons using their portable patron units 102 are displayed. For example, portable staff unit 104 displays patrons logged onto network 110 and possibly their relative zone locations, such as the pool or beach. Portable staff unit 104 may limit the display to the quantity of patrons logged into the network in a particular zone of responsibility for a staff member.

In block 1214, the actual location of a portable patron unit 102 may be determined and displayed on portable staff units 104 (or other devices) to enable staff members to quickly and efficiently deliver items ordered or services requested directly to a patron.

In block 1216, the quantity of outstanding orders pending that have not been delivered and closed-out may be displayed on a portable staff unit 104.

In block 1218, messages generated by the resort or staff members of the resort, patrons and potentially other entities, may be transmitted and displayed on portable staff units 104.

In block 1220, portable staff units 104 may receive a notification of a page from a portable patron unit 102 that a patron is requesting immediate service, e.g., the patron has selected a call service button or any other type of paging mechanism on their portable patron unit 102.

In block 1222, portable staff units 104 may receive and display menus (such as food and beverage menus) such as to enable staff members to view the menus, answer questions about the menu items, and/or take an order at the request of patron, etc.

In block 1224, portable staff units 104, receives and displays a notification/page that a patron has requested their bill.

In block 1226, the real-time activity of a patron performed on a portable patron device 102 is displayed on portable staff unit 104.

It is noted that program applications 130 such as off-the-shelf application(s) 224, order/service application 326, patron information application 327, real-time activity application 329, and location application 331 executing on processor(s) 306 (FIG. 2) and 408 (FIG. 4) and stored in memory 216 (FIG. 3) and 406 (FIG. 4) are implemented to perform one or more portions of the functionality associated with method 1200. Accordingly, program applications 130 generate menus, user interfaces, guides, screens, and so forth for display which enable a staff member to service patrons, such as receiving orders, viewing order details, receiving the location of portable staff units, receive service requests, browse information, and so forth.

Figure 13:
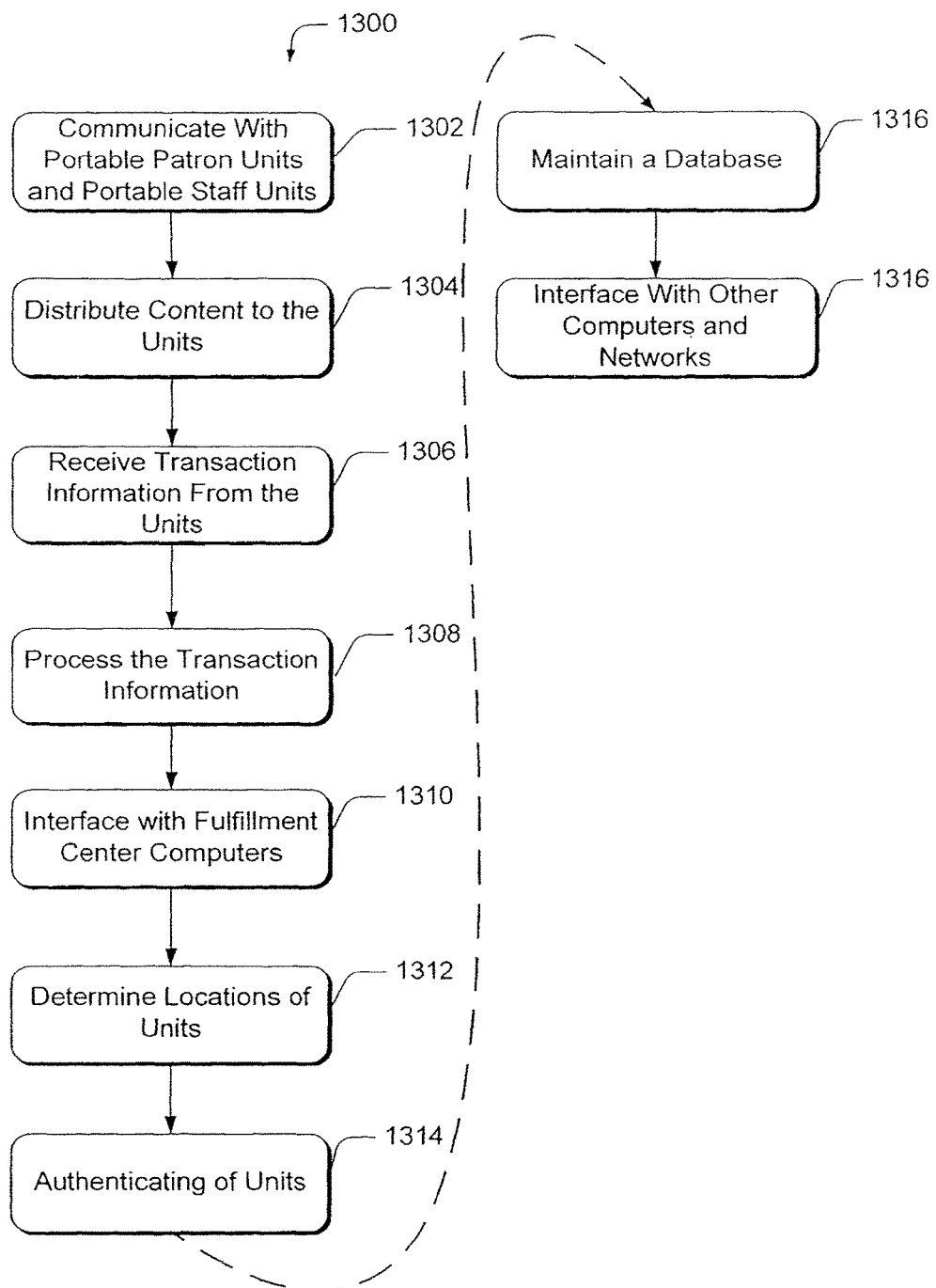
FIG. 13 is a flow diagram that illustrates an exemplary method of operation associated with a central unit.

FIG. 13 is a flow diagram that illustrates an exemplary method 1300 of operation associated with central unit 106. The order in which the method is described is not intended to be construed as a limitation, and any number of the described method blocks can be combined in any order to implement the method. Each of the operations and blocks may be optional and do not necessarily have to be implemented. Furthermore, the method can be implemented in any suitable hardware, software, firmware, or combination thereof. Exemplary method 1300 includes blocks 1302 through 1316.

In block 1302, central unit 106 communicates with portable patron units 102 and portable staff units 104 as a server in a client/server relationship.

In block 1304, central unit 106 distributes content to both the portable patron units 102 and portable staff units 104. The content may include menus for order items, services offered by the resort, advertisements, a history of an item previously ordered by a particular patron, preference information, special needs/requests and preference information associated with a patron, status of an open or request, and so forth.

In block 1306, central unit 106 receives transaction information from the portable patron units 102 and portable staff units 104. The transaction information may include orders, requests for services, requests for a bill, etc.

In block 1308, central unit 106 processes the transaction information by routing orders or requests to appropriate staff members or fulfillment centers to be carried out. Central unit 106 may also store the transaction information in databases 112 (FIG. 1).

In block 1310, central unit 106 interfaces with POS computers such as fulfillment center computers 108 and hotel management systems.

In block 1312, central unit 106 determines the location of portable units such as portable patron units 102 and sends details of the location (such as on a map) to portable staff units for display.

In block 1314, central unit 106 verifies portable patron units 102 and portable staff units 104 as authorized devices and authenticates their users based on security codes.

In block 1316, central unit 106 maintains a databases 112 necessary for servicing content to other units, such as maintaining transaction information, maintain menu information, descriptions, photos, prices, status of items (such as "sold out"), and so forth. A database 112 may also contain information to enable resort management to monitor performance of staff (such as how many orders have been serviced and/or time used to deliver and/or fulfill orders), average sale prices, best selling items, beverage to food ratios, abandoned orders, page views, and so forth.

In block 1316, central unit 106 serves as an interface to other devices such as a gateway to the Internet or as an interface to POS systems, etc.

It is noted that program applications 130 and data stored in memory 406 are implemented to perform one or more portions of the functionality associated with method 1300.

Although some implementations of the various methods and arrangements of the present invention have been illustrated in the accompanying Drawings and described m the foregoing Detailed Description, it will be understood that the invention is not limited to the exemplary aspects disclosed, but is capable of numerous rearrangements, modifications and substitutions without departing from the spirit of the invention as set forth and defined by the following claims.

What is claimed is:

1. A computer-implemented method executed by one or more processors of a first mobile computing device, the method comprising:
   receiving, over a wireless communications channel and by the one or more processors, a venue-specific application;
   communicating, by the one or more processors, with a server system over the wireless communication channel to authenticate, based on a security protocol, a user of the venue-specific application on the first mobile computing device;
   determining, by the one or more processors, a location of the first mobile computing device at a first time based on one or more wireless signals;
   receiving, by the one or more processors, a user input indicating a service request through the venue-specific application;
   providing, to the server system, data indicating the location of the first mobile computing device, information associated with a user of the first mobile computing device, and an indication of the service request, wherein the indication of the service request causes the server system to send the location of the first mobile computing device and the information associated with the user of the first mobile computing device to a second mobile computing device to facilitate presentation of the location of the first mobile computing device on a display of the second mobile computing device in real-time;
   determining, by the one or more processors, an updated location of the first mobile computing device at a second time based on the one or more wireless signals; and
   providing, to the server system, data indicating the updated location of the first mobile computing device.

2. The method of claim 1, wherein the venue-specific application is a web-based application.

3. The method of claim 1, further comprising:
   receiving, from the server system, information about a status of the service request; and
   causing the information to be presented on a display of the first mobile computer device.

4. The method of claim 1, wherein the one or more wireless signals include Global Positioning (GPS) signals.

5. The method of claim 1, wherein the one or more wireless signals include WiFi signals or Bluetooth signals.

6. The method of claim 1, further comprising: receiving a user input indicating user payment information; and facilitating an electronic payment based on the user input.

7. The method of claim 1, wherein the wireless communication channel includes a WiFi network.

8. A computer-implemented method executed by one or more processors, the method comprising:
   providing, over a wireless communications channel and by the one or more processors, a venue-specific application to a mobile computing device;
   communicating, by the one or more processors, with the mobile computing device over the wireless communication channel to authenticate, based on a security protocol, a user of the venue-specific application on the mobile computing device;
   receiving, by the one or more processors, location information from the mobile computing device;
   determining, by the one or more processors, a location of the mobile computing device at a first time based on the location information;
   mapping, by the one or more processors, the location to a region that is associated with a venue;
   receiving, from the mobile computing device, order information for the venue that indicates a user selection of an order option from the venue-specific application;
   receiving, by the one or more processors, updated location information from the mobile computing device; and
   determining, by the one or more processors, an updated location of the mobile computing device at a second time based on the updated location information.

9. The method of claim 8, further comprising upon receiving an indication that an order is ready, providing the updated location of the mobile computing device to a delivery computing device to facilitate delivery of the order to the user.

10. The method of claim 8, further comprising identifying a computing system associated with the venue-specific application and providing the order information to the identified computing system.

11. The method of claim 8, wherein the venue-specific application is a web-based application.

12. The method of claim 8, wherein the location information includes Global Positioning (GPS) data.

13. The method of claim 8, wherein the location information includes WiFi location information.

14. The method of claim 8, wherein the wireless communication channel includes a WiFi network or a Bluetooth network.

15. A computer-implemented method executed by one or more processors of a server system, the method comprising:
   providing, over a wireless communications channel and by the one or more processors, a venue-specific application to each of a plurality of mobile computing device;
   receiving, by the one or more processors, first location information from each of the plurality of mobile computing devices;
   determining, by the one or more processors, a first location of each of the plurality of mobile computing devices based on the first location information;
   receiving, from one of the mobile computing devices, a service request associated with the venue-specific application;
   receiving, by the one or more processors, updated location information from each of the mobile computing devices;
   determining, by the one or more processors, updated locations for each of the mobile computing devices based on the updated location information; and
   mapping the updated locations for each of the mobile computing devices to a region that is associated with a venue.

16. The method of claim 15, further comprising sending, to a delivery computing device, data indicating the service request and updated location information associated with the one of the mobile computing devices to facilitate performance of the service request.

17. The method of claim 15, wherein the venue is associated with the venue-specific application.

18. The method of claim 15, further comprising sending, to a delivery computing device, data indicating the service request and updated location information associated with the one of the mobile computing devices to facilitate presentation, on a display of the delivery computing device, of a location of the one of the mobile computing devices in a graphical map.

19. The method of claim 8, wherein the venue is associated with the venue-specific application.

* * * * *

UNITED STATES PATENT AND TRADEMARK OFFICE
CERTIFICATE OF CORRECTION

PATENT NO. : 10,157,414 B2
APPLICATION NO. : 15/820195
DATED : December 18, 2018
INVENTOR(S) : Julie M. Werbitt Page 1 of 1

It is certified that error appears in the above-identified patent and that said Letters Patent is hereby corrected as shown below:

In the Specification

Column 1, Line 9, after "13/073,368, filed" insert -- on --, therefor.

In the Claims

Column 26, Line 30, Claim 4, after "Positioning" insert -- -System --, therefor.

Column 27, Line 8, Claim 12, after "Positioning" insert -- System --, therefor.

Signed and Sealed this
Thirtieth Day of April, 2019

Andrei Iancu
*Director of the United States Patent and Trademark Office*